(12) United States Patent
Kubo

(10) Patent No.: US 11,370,418 B2
(45) Date of Patent: Jun. 28, 2022

(54) PARKING ASSIST SYSTEM AND PARKING ASSIST DEVICE

(71) Applicant: CLARION CO., LTD., Saitama (JP)

(72) Inventor: Atsushi Kubo, Saitama (JP)

(73) Assignee: CLARION CO., LTD., Saitama (JP)

( * ) Notice: Subject to any disclaimer, the term of this patent is extended or adjusted under 35 U.S.C. 154(b) by 0 days.

(21) Appl. No.: 17/254,012

(22) PCT Filed: May 20, 2019

(86) PCT No.: PCT/JP2019/019906
§ 371 (c)(1),
(2) Date: Dec. 18, 2020

(87) PCT Pub. No.: WO2019/244537
PCT Pub. Date: Dec. 26, 2019

(65) Prior Publication Data
US 2021/0269020 A1    Sep. 2, 2021

(30) Foreign Application Priority Data

Jun. 20, 2018    (JP) .............................. JP2018-116620

(51) Int. Cl.
*B60Q 1/48*    (2006.01)
*B60W 30/06*    (2006.01)
(Continued)

(52) U.S. Cl.
CPC ........... *B60W 30/06* (2013.01); *G06V 20/586* (2022.01); *G08G 1/0141* (2013.01); *G08G 1/142* (2013.01)

(58) Field of Classification Search
CPC ........... B60W 30/06; B60W 2050/146; B60W 50/14; B60W 2510/186; B60W 2540/215;
(Continued)

(56) References Cited

U.S. PATENT DOCUMENTS 9,984,572 B1 *   5/2018   Newman ............ G06K 9/00812
10,169,996 B2 *  1/2019   Liu .................. G08G 1/096883
(Continued)

FOREIGN PATENT DOCUMENTS

CN    105551301    5/2016
CN    107499307    12/2017
(Continued)

OTHER PUBLICATIONS

International Search Report dated Jun. 18, 2019 in International (PCT) Application No. PCT/JP2019/019906.
(Continued)

*Primary Examiner* — Anh V La
(74) *Attorney, Agent, or Firm* — Wenderoth, Lind & Ponack, L.L.P.

(57) ABSTRACT

A parking assist system includes a server device and a parking assist device provided in a host vehicle to communicate with the server device. The server device comprises a server storage portion that is configured to store parking lot information acquired when a second vehicle different from the host vehicle is parked in a parking section of a parking lot. The parking assist device includes a parking lot information receiver configured to receive the parking lot information from the server device, and a parking assist controller configured to control the host vehicle based on the obtained parking lot information to park the host vehicle in the parking section of the parking lot.

3 Claims, 15 Drawing Sheets

(51) Int. Cl.
  *G08G 1/01* (2006.01)
  *G08G 1/14* (2006.01)
  *G06V 20/58* (2022.01)
(58) Field of Classification Search
  CPC .......... B60W 2556/45; G06K 9/00812; G08G 1/0141; G08G 1/142; G08G 1/168; E04H 6/426; G60V 20/586
  USPC ............. 340/932.2, 933, 937, 903, 988
  See application file for complete search history.

(56) References Cited

U.S. PATENT DOCUMENTS

| | | | |
|---|---|---|---|
| 2014/0313058 A1* | 10/2014 | Chen | G08G 1/144 340/932.2 |
| 2015/0154868 A1* | 6/2015 | Neuner | H04W 4/16 340/932.2 |
| 2017/0183001 A1 | 6/2017 | Yamamoto et al. | |
| 2017/0263124 A1 | 9/2017 | Li | |
| 2017/0355307 A1 | 12/2017 | Ha et al. | |
| 2019/0325522 A1* | 10/2019 | Bathia | G06K 9/00624 |
| 2020/0272950 A1 | 8/2020 | Xu et al. | |

FOREIGN PATENT DOCUMENTS

| | | |
|---|---|---|
| CN | 108010373 | 5/2018 |
| EP | 3 142 091 | 3/2017 |
| GB | 2552020 | 1/2018 |
| GB | 2552407 | 1/2018 |
| JP | 2006-209429 | 8/2006 |
| JP | 2009-169527 | 7/2009 |
| JP | 2010-96890 | 4/2010 |
| JP | 2014-85192 | 5/2014 |
| JP | 2014-125196 | 7/2014 |
| JP | 2014-137743 | 7/2014 |
| JP | 2017-102015 | 6/2017 |
| KR | 1020120138318 | 12/2012 |

OTHER PUBLICATIONS

Office Action dated Dec. 2, 2021 in corresponding Chinese Patent Application No. 201980038672.2, with English Translation.
Extended European Search Report dated Feb. 15, 2022 in European Application No. 19822698.7.

* cited by examiner

FIG.6

311 RECEIVED INFORMATION DB

- 311a PARKING LOT INFORMATION ID (AUTOMATIC SETTING)
- 311b RECORDING DATE
- 311c RECORDING START TIME
- 311d PARKING LOT LOCATION INFORMATION
- 311e PARKING LOT IMAGE INFORMATION
- 311f PARKING LOT SURROUNDING INFORMATION
- 311g VEHICLE BEHAVIOR INFORMATION
- 311h PARKING LOCATION INFORMATION
- 311j VEHICLE TYPE
- 311k MODEL YEAR
- 311m VEHICLE GRADE
- 311n VEHICLE IDENTIFICATION NUMBER
- 311p PARKING SECTION NUMBER
- 311q ACHIEVEMENT

312 PARKING LOT POI DB

| POI ID | PARKING LOT NAME | CENTER COORDINATES |
|---|---|---|

- 312a POI ID
- 312b PARKING LOT NAME
- 312c CENTER COORDINATES

313 PARKING LOT LOCATION INFORMATION DB

| POI ID | ENTRANCE/EXIT NAME | PARKING LOT LOCATION INFORMATION |
|---|---|---|

- 313a POI ID
- 313b ENTRANCE/EXIT NAME
- 313c PARKING LOT LOCATION INFORMATION

} FIRST VEHICLE INFORMATION

314 CONTRACT INFORMATION DB

| POI ID | CONTRACT INFORMATION |
|---|---|

- 314a POI ID
- 314b CONTRACT INFORMATION

315 PARKING LOT INFORMATION DB

- 315a POI ID
- 315b VEHICLE TYPE
- 315c MODEL YEAR
- 315d VEHICLE GRADE
- 315e PARKING SECTION NUMBER
- 315f NUMBER OF ACHIEVEMENTS (SUCCESS)
- 315g NUMBER OF ACHIEVEMENTS (FAILURE)
- 315h LAST PARKED DATE
- 315j RECORDING DATE
- 315k RECORDING START TIME
- 315m PARKING LOT INFORMATION ID
- 315n PARKING LOT LOCATION INFORMATION
- 315p PARKING LOT IMAGE INFORMATION
- 315q PARKING LOT SURROUNDING INFORMATION
- 315r VEHICLE BEHAVIOR INFORMATION
- 315s PARKING LOCATION INFORMATION

} FIRST VEHICLE INFORMATION

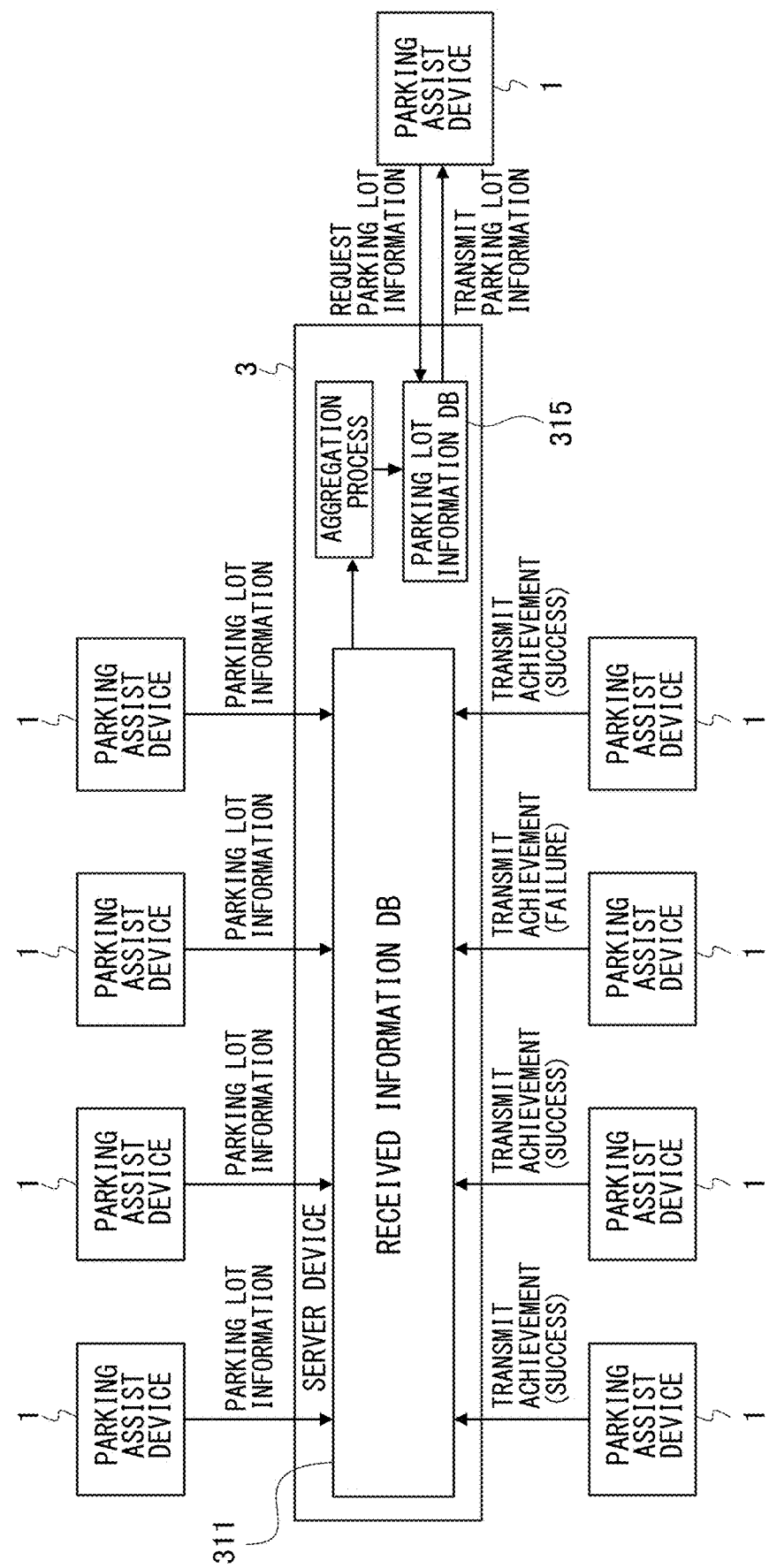

PARKING ASSIST SYSTEM AND PARKING ASSIST DEVICE

This application is based upon and claims the benefit of priority from Japanese Patent Application No. 2018-116620 filed to Japan Patent Office on Jun. 20, 2018, the entire disclosure of which are incorporated herein by reference.

TECHNICAL FIELD

A present disclosure relates to a parking assist system and a parking assist device that perform a parking assist operation by using parking lot information for parking a host vehicle in a parking section of a parking lot.

BACKGROUND ART

A parking assist operation is known in the art. In such a parking assist operation, information on the environment around the parking lot and parking patterns when a host vehicle is parked in a parking area or section of a parking lot are stored, and the parking assist operation is performed by using the information such as the environment around the parking lot when the host vehicle is parked again in the parking lot on which the environment information has been stored.

Also, it is known that automatic parking is performed based on the parking lot information from a server device (see JP 2017-102015A, for example).

However, in JP 2017-102015A, a navigation device only displays whether the host vehicle can be parked or not based on the parking lot information. Therefore, information on parking lots which have been used before cannot be shared.

Accordingly, an object of the present disclosure is to provide a parking assist system and a parking assist device that are capable of sharing parking lot information on parking lots which have been parked before.

To achieve the above object, a parking assist system includes a server device and a parking assist device that is provided in a host vehicle to communicate with the server device, wherein the server device includes a server storage portion that is configured to store parking lot information that is acquired when a second vehicle different from the host vehicle is parked in a parking section of a parking lot. The parking assist device includes a parking lot information receiver that is configured to receive the parking lot information from the server device, and a parking assist controller that is configured to control the host vehicle based on the obtained parking lot information to park the host vehicle in the parking section of the parking lot.

BRIEF DESCRIPTION OF DRAWINGS

FIG. 6 is a schematic view illustrating data structure of the database stored in a parking assist device storage portion of the server device of the embodiment.

FIG. 7 is a schematic view illustrating communication of information between the parking assist device and the server device of the embodiment.

DETAILED DESCRIPTION (Configuration of Parking Assist System) Hereinafter, an embodiment of the present disclosure will be described with reference to the drawings. FIG. 1 is a block diagram illustrating the configuration of a parking assist system according to an embodiment of the present disclosure.

As shown in FIG. 1, a parking assist system S of the present embodiment includes a parking assist device 1, an information communication terminal 2 and a server device 3.

Figure 2:
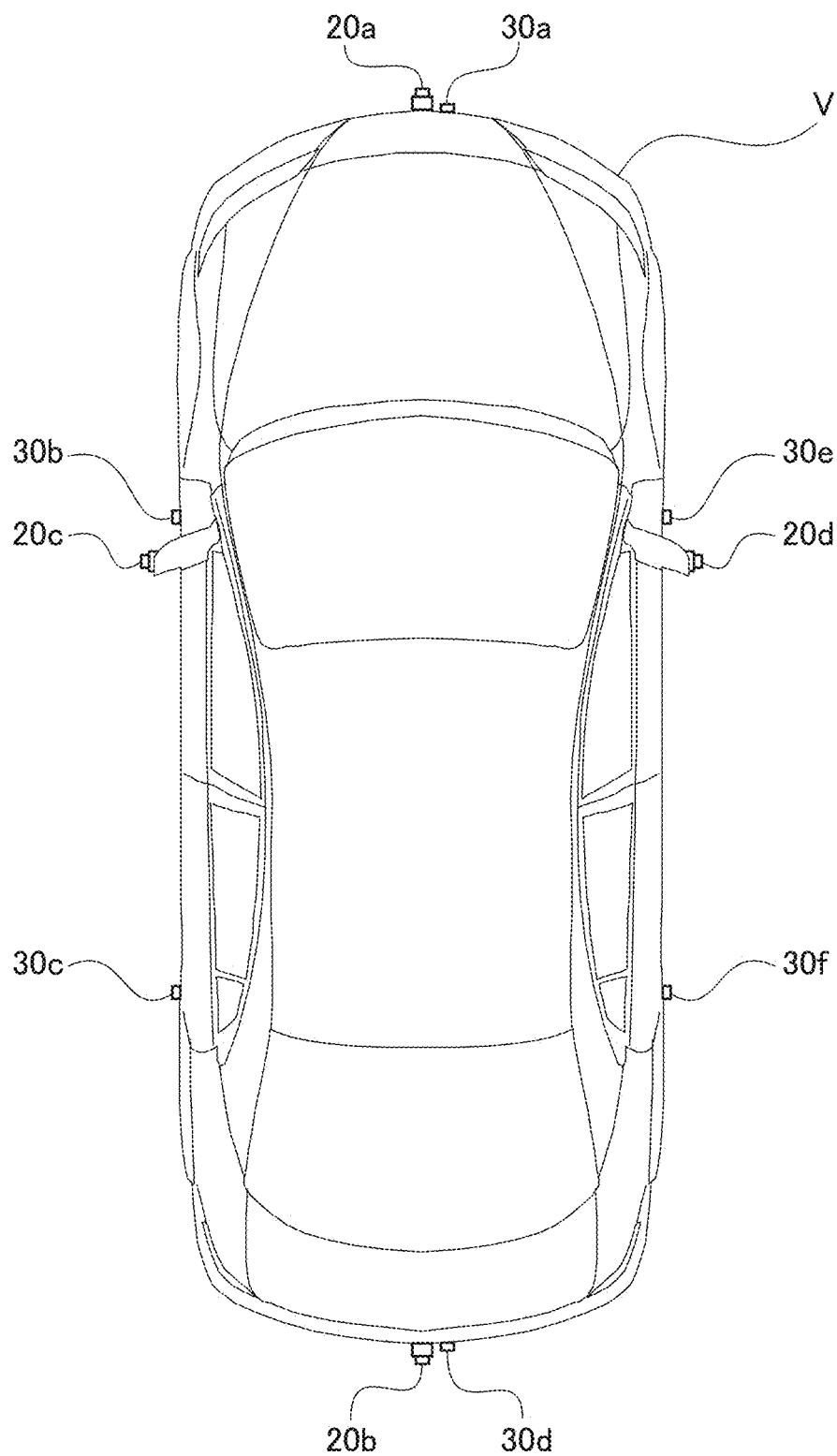
FIG. 2 is a schematic view illustrating an example of the positions of imagers and surrounding information detectors in a parking assist device of the embodiment.

The parking assist device 1 is provided in a vehicle V (see FIG. 2). The parking assist device 1 is configured to perform a parking assist operation for parking the vehicle V in a parking section or area of a parking lot.

The information communication terminal 2 is an information processing device that has a communication function, such as a smart phone, a tablet terminal, for example. The information communication terminal 2 is configured to communicate with the parking assist device 1 and the server device 3, respectively. In addition, the information communication terminal 2 is configured to transmit parking lot information and the like from the server device 3 to the parking assist device 1, and transmit the parking lot information and the like from the parking assist device 1 to the server device 3.

Generally, the information communication terminal 2 communicates with the server device 3 via the mobile communication network and communicates with the parking assist device 1 via short-range wireless communication such as Bluetooth (Registered Trademark) or wireless LAN.

Generally, most of the parking assist device 1 including a navigation system, which is described below, does not include means for communicating with the server device 3. Therefore, the information communication terminal 2 intermediates with the communication between the parking assist device 1 and the server device 3. Accordingly, it may be unnecessary to include the information communication terminal 2 in the case that the parking assist device 1 includes a mobile communication module or the like. Alternatively, the information communication terminal 2 may have a function to control the parking assist operation by the parking assist device 1. In this case, the information communication terminal 2 is an essential element in the parking assist system S.

The server device 3 is connected to WAN (Wide Area Network) such as the Internet or the like and communicates with the information communication terminal 2 via WAN and the mobile communication network. It is preferable that the server device 3 is an information processing device.

In the parking assist system S of the present embodiment, the server device 3 stores the parking lot information that is used when the parking assist operation is performed to park the vehicle V in the parking section of the parking lot. This parking lot information is acquired when the parking assist operation is performed to park a second vehicle in the same parking section in which the vehicle V (host vehicle) to be parked. The other (second) vehicle has the same vehicle information as the vehicle V (host vehicle).

The parking assist device 1 of the present embodiment has functions of the host vehicle and the second vehicle. In other words, the parking assist device 1 of the present embodiment has functions of the parking assist device for the host vehicle and the parking assist device for the second vehicle.

Accordingly, the parking assist device 1 of the present embodiment performs the parking assist operation by using the parking lot information if the server device 3 stores the parking lot information having the same vehicle information (parking assist device of host vehicle in this case). On the other hand, the parking assist device 1 acquires the parking lot information when a driver manually performs the parking operation (i.e. without parking assist operation by parking assist device 1) if the server device 3 does not store the parking lot information having the same vehicle information (i.e. parking assist device of other (second) vehicle in this case). The acquired parking lot information is transmitted to the server device 3 and used by the parking assist device 1 of the other vehicle(s) (i.e. parking assist device of host vehicle).

(Configuration of Parking Assist Device) The parking assist device 1 of the present embodiment is provided in the vehicle V shown in FIG. 2. As shown in FIG. 2, the vehicle V includes a plurality of compact cameras in front, rear, left and right portions thereof, respectively.

Specifically, a front camera 20*a* is provided on a front bumper or a front grill of the vehicle V to face forward (i.e. traveling direction) of the vehicle V. A rear camera 20*b* is provided on a rear bumper or a rear garnish of the vehicle V to face rearward of the vehicle V. A left side camera 20*c* is provided on a left side door mirror of the vehicle V to face the leftward of the vehicle V. A right side camera 20*d* is provided on a right side door mirror of the vehicle V to face the rightward of the vehicle V.

Each of the front camera 20*a*, the rear camera 20*b*, the left side camera 20*c*, and the right side camera 20*d* includes a wide-angle lens or a fisheye lens for the wide area observation. The four cameras 20*a* to 20*d* are configured and arranged to be able to entirely observe areas around the vehicle V including road surfaces.

Figure 1:
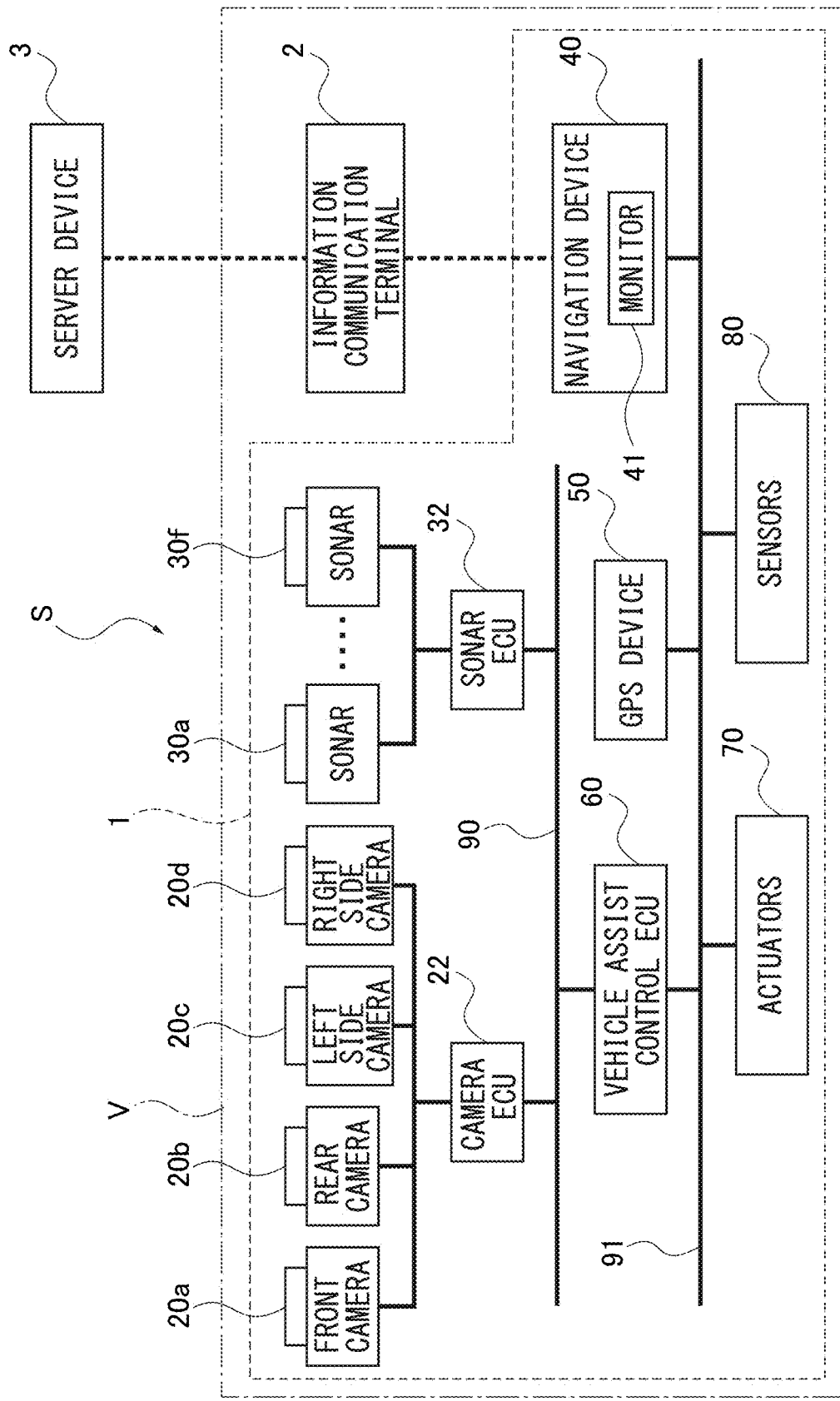
FIG. 1 is a block diagram schematically illustrating the configuration of a parking assist system of a present embodiment.

Further, as shown in FIG. 1, sonars 30*a* to 30*f* are disposed on the front side, the rear side, the left side and the right side of the vehicle V, respectively.

Specifically, the sonar 30*a* is provided on the front bumper or the front grill of the vehicle V to face forward thereof. The sonars 30*b* and 30*c* are provided on the left side of the vehicle V to face the leftward thereof. The sonar 30*d* is provided on the rear bumper or the rear garnish of the vehicle V to face rearward thereof. The sonars 30*e* and 30*f* are provided on the right side of the vehicle V to face the rightward thereof.

Each of the sonars 30*a* to 30*f* has a distance measurement range that extends horizontally. The sonars 30*a* to 30*f* are configured and arranged to measure distances entirely around the vehicle V.

Note that instead of the sonars 30*a* to 30*f*, radars such as millimeter wave radars may be disposed. Generally, the radar has superior performance for the longer distance measurement to the sonar. Accordingly, the sensors (e.g. radars or sonars) may be selected depending on the size of the distance range around vehicle V required for automatic parking.

The parking assist device 1 of the present embodiment includes the front camera 20*a*, the rear camera 20*b*, the left side camera 20*c*, the right side camera 20*d*, a camera ECU 22, the sonars 30*a* to 30*f*, and a sonar ECU 32. The camera ECU 22 is configured to control the cameras 20*a* to 20*d*, generate an overhead image or bird's eye view image, detect the parking sections, set a target parking section, perform the position correction of the parking section, and the like. The sonar ECU 32 is configured to control the sonars 30*a* to 30*f* and detect obstacles around the vehicle V.

Further, the parking assist device 1 includes a navigation device 40 and a GPS device 50. The navigation device 40 includes a monitor 41 that has an image display function. In FIG. 1, the GPS device 50 is configured to calculate the current location of the vehicle V. The navigation device 40 includes a storage portion that stores map data for route guidance and the like. The navigation device 40 performs the route guide to the target point set by an operator of the navigation device 40 based on data such as the map data and the current location of the vehicle V detected by the GPS device 50. The monitor 41 displays various images during the route guidance operation. In addition, the navigation device 40 includes a short-range wireless module and communicates with the information communication terminal 2.

Further, the parking assist device 1 includes a vehicle control ECU 60. The vehicle control ECU 60 is configured to determine a target parking lot candidate for the automatic parking based on information from the camera ECU 22, the sonar ECU 32, the navigation device 40, and the GPS device 50, and to control the parking assist operation to decide the traveling direction of the vehicle V and the like.

In addition, the parking assist device 1 includes actuators 70 that are configured to respectively control the various portions of the vehicle V based on the parking assist operation control information determined by the vehicle control ECU 60. The actuator 70 herein include a control portion that controls the actuator 70.

For example, the actuator 70 may include a steering control portion (steering control unit) that controls the steering angle of the vehicle V and a power steering actuator that is controlled by the steering control portion, a throttle control portion (throttle control unit) that controls the throttle of the vehicle V and a throttle actuator that is controlled by the throttle control portion, as well as a brake control portion (brake control unit) that controls the brake of the vehicle V and a brake actuator that is controlled by the brake control portion.

Moreover, the parking assist device 1 includes sensors 80 for acquiring information required to control the parking assist operation. For example, the sensors 80 include a vehicle speed sensor, a steering angle sensor, a yaw rate sensor, and a shift position sensor for acquiring information to identify the current location of the vehicle V as well as information to control the vehicle speed and the starring angle of the vehicle V necessary when the automatic parking is performed.

The camera ECU 22, the sonar ECU 32, and the vehicle control ECU 60 are connected to a sensor information system network 90 provided inside the vehicle V. The sensor information system network 90 consists of CAN (i.e. Controller Area Network) (Registered Trademark), for example. The navigation device 40, the GPS device 50, the actuator 70, the sensor 80, and the vehicle control ECU 60 are connected to a vehicle information system network 91 provided inside the vehicle V. The vehicle information system network 91 consists of CAN (Registered Trademark), for example.

Here, in the embodiment shown in FIG. 2, a radar (not show in FIG. 2) may be provided instead of the sonars 30a to 30f In the case that the radar is provided, a radar ECU (not show in FIG. 2) may be provided to control the radar and detect obstacles around the vehicle V.

Of course, the sonars 30a to 30f may be provided together with the radars since the measurement range of the sonars 30a to 30f is different from that of the radar. Also, a so-called motion stereo function may be provided to achieve the distance measurement function. The motion stereo function detects obstacles by comparing images captured by the front camera 20a, the rear camera 20b, the left side camera 20c, and the right side camera 20d at different time. Hereinafter, in order to simplify the description of the parking assist device 1, the parking assist device 1 is described only including the sonars 30a to 30f and the sonar ECU 32 as distance measurement means.

Figure 3:
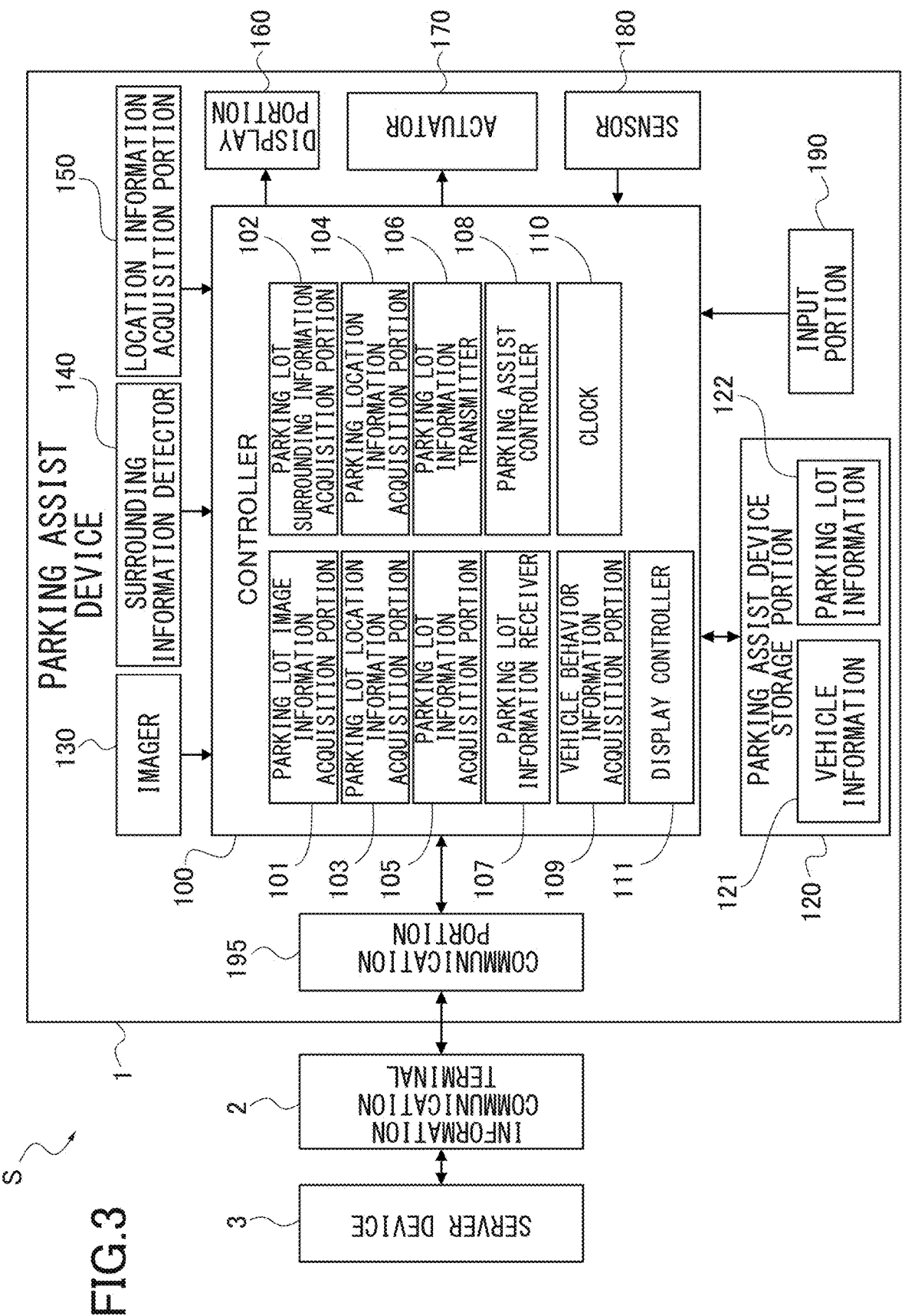
FIG. 3 is a functional block diagram schematically illustrating the configuration of the parking assist device in the embodiment.

(Functional Configuration of Parking Assist Device) FIG. 3 is a functional block diagram schematically illustrating the configuration of the parking assist device 1 that is applied to the parking assist system S in the present embodiment.

The parking assist device 1 of the present embodiment includes a controller 100, a parking assist device storage portion 120, an imager 130, a surrounding information detector 140, a location information acquisition portion 150, a display portion 160, an actuator 170, a sensor 180, an input portion 190, and a communication portion 195.

The controller 100 that mainly consists of the vehicle control ECU 60 is configured to control the entire parking assist device 1. The controller 100 includes arithmetic elements represented by a CPU, a programmable logic device such as an FPGA, and an integrated circuit such as an ASIC.

The parking assist device storage portion 120 of the parking assist device 1 stores a control program (not shown).

The controller 100 runs the control program when the parking assist device 1 is activated and accordingly that the parking assist device 1 has the functional configuration as show in FIG. 3. In particular, it is preferable that the parking assist device 1 of the present embodiment includes an arithmetic element capable of high-speed calculation, such as an FPGA since high-speed image processing is performed, which is described below.

The controller 100 includes a parking lot image information acquisition portion 101, a parking lot surrounding information acquisition portion 102, a parking lot location information acquisition portion 103, a parking location information acquisition portion 104, a parking lot information acquisition portion 105, a parking lot information transmitter 106, a parking lot information receiver 107, a parking assist controller 108, a vehicle behavior information acquisition portion 109, a clock (timekeeping portion) 110, and a display controller 111.

The parking lot image information acquisition portion 101 is configured to acquire the parking lot image information, which is obtained by capturing or imaging a road or passage from the entrance/exit of the parking lot to the parking section of the parking lot where the vehicle V is parked, based on image information acquired by the imager 130 capturing the surroundings of the vehicle V. The parking lot image information acquired by the parking lot image information acquisition portion 101 is temporarily stored in the parking assist device storage portion 120.

The parking lot surrounding information acquisition portion 102 is configured to acquire parking lot surrounding information on obstacles around the passage from the entrance/exit of the parking lot to the parking section of the parking lot where the vehicle V is parked based on the surrounding information acquired by the surrounding information detector 140. The parking lot surrounding information acquired by the parking lot surrounding information acquisition portion 102 is also temporarily stored in the parking assist device storage portion 120.

The parking lot location information acquisition portion 103 is configured to acquire the parking lot location information that is information on the locations of the entrance and the exit of the parking lot based on the current location information of the vehicle V acquired by the location information acquisition portion 150. The parking lot location information acquired by the parking lot location information acquisition portion 103 is also temporarily stored in the parking assist device storage portion 120.

The parking location information acquisition portion 104 is configured to acquire parking location information in accordance with the current location information of the vehicle V acquired by the location information acquisition portion 150. The parking location information is information on the locations of the parking sections in the parking lot.

The parking lot information acquisition portion 105 is configured to collectively acquire, as parking lot information 122, the parking lot image information, the parking lot surrounding information, the parking lot location information, and the parking location information acquired by the parking lot image information acquisition portion 101, the parking lot surrounding information acquisition portion 102, the parking lot location information acquisition portion 103, and the parking location information acquisition portion 104, respectively and to store the parking lot information 122 in the parking assist device storage portion 120.

The parking lot information transmitter 106 is configured to transmit the parking lot information 122 acquired by the parking lot information acquisition portion 105 to the server device 3 via the communication portion 195 and the information communication terminal 2. The parking lot information transmitter 106 may transmit the parking lot information 122 to the server device 3 at any time. However, it is preferable that the parking lot information transmitter 106 transmits the parking lot information 122 to the server device 3 when the vehicle V is started after parked in the parking section. More preferably, the parking lot information transmitter 106 transmits the parking lot information 122 to the server device 3 when the ignition switch is operated to turn on the ACC (accessory).

The parking lot information receiver 107 is configured to receive the parking lot information 122 transmitted from the server device 3 and store the received parking lot information 122 in the parking assist device storage portion 120.

The parking assist controller 108 is configured to control the vehicle V to park it in the parking section of the parking lot based on the parking lot information 122 acquired by the parking lot information receiver 107. More specifically, the parking assist controller 108 is configured to control the actuator 170 to park the vehicle V in the parking section of the parking lot based on the parking lot information 122. Preferably, the parking assist controller 108 also controls the vehicle V based on the detection information from the imager 130, the surrounding information detector 140, the location information acquisition portion 150, and the sensor 180 on the passage from the entrance/exit of the parking lot to the parking section thereof. The more detailed description of the specific control procedure by the parking assist controller 108 is omitted since such a procedure is known in the art.

The vehicle behavior information acquisition portion 109 acquires, based on the information detected by the sensor 180, the vehicle behavior information on the behavior of the vehicle V from entering the entrance/exit of the parking lot to the parking section of the parking lot where the vehicle V is parked. Also, the parking lot information acquisition portion 105 acquires, as the parking lot information 122, the vehicle behavior information acquired by the vehicle behavior information acquisition portion 109 and stores the parking lot information 122 in the parking assist device storage portion 120.

The clock 110 is configured to detect current time. The display controller 111 is configured to generate a display control signal to display images on the display portion 160 in accordance with information acquired from results of various control operations by the controller 100 and to transmit the display control signal to the display portion 160.

The parking assist device storage portion 120 mainly consists of the vehicle control ECU 60. The parking assist device storage portion 120 includes a storage medium such as a large-capacity storage medium (e.g. a hard disk drive) or a semiconductor storage medium (e.g. ROM, RAM). The parking assist device storage portion 120 temporarily or permanently stores various data that is used for various operations in the controller 100.

The parking assist device storage portion 120 stores the parking lot information 122 and vehicle information 121. The vehicle information 121 is information that can uniquely identify the vehicle V. The vehicle information 121 is the information on the other vehicle(s) in the case that the parking assist device 1 is for the host vehicle as recited in the claims. On the other hand, the vehicle information 121 is the information on the host vehicle in the case that the parking assist device is for the other vehicle(s).

The imager 130 mainly consists of the cameras 20a to 20d and the camera ECU 22. The imager 130 is configured to output an image signal generated by capturing or photographing the surroundings around the vehicle V. In particular, the imager 130 in the present invention has a function to generate the overhead image of the road surface around the vehicle V as if the road surface were viewed from directly above the vehicle V.

Figure 8:
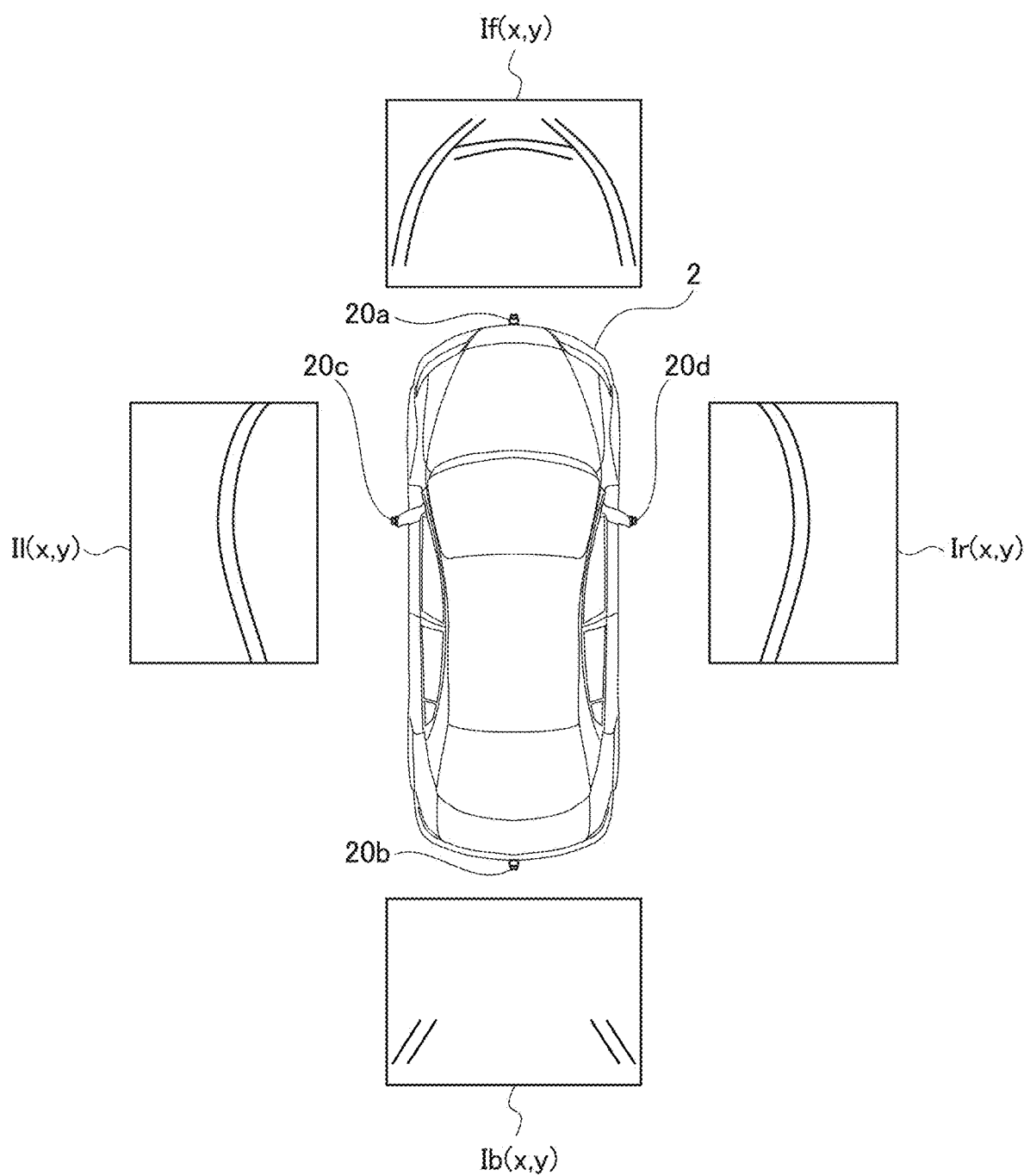
FIG. 8 is a schematic view illustrating an example of images captured by the imager of the parking assist device in the embodiment.

FIG. 8 is a schematic view illustrating an example of images respectively captured by the front camera 20a, the rear camera 20b, the left side camera 20c, and the right side camera 20d (imager 130 shown in FIG. 3) in the vehicle V. As shown in FIG. 8, the image (or view) including the road surfaces around the vehicle V is observed or monitored by the cameras 20a to 20d in a perspective-transformed state.

Figure 9:
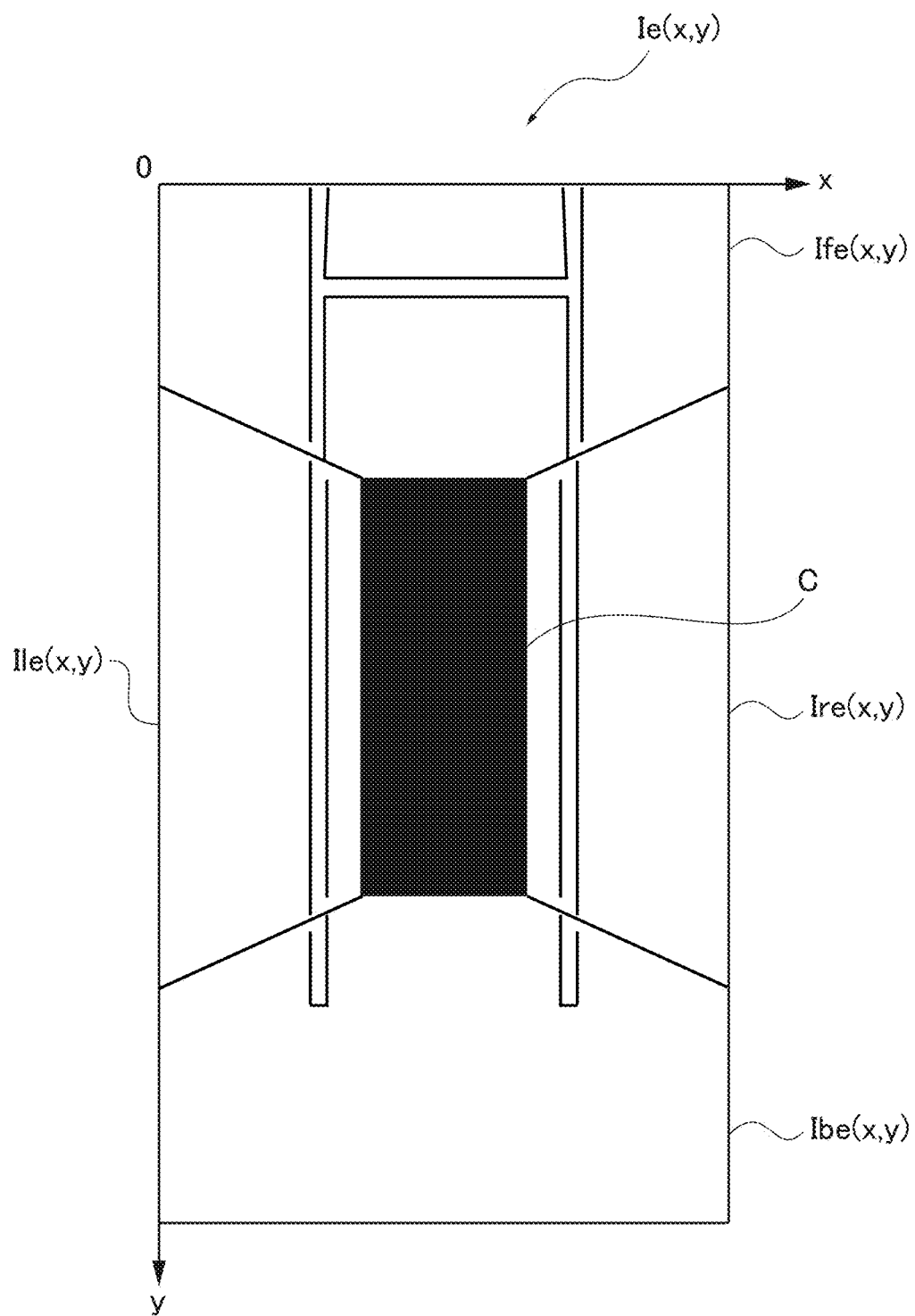
FIG. 9 is a schematic view illustrating an example of an overhead image using the image captured by the imager of the parking assist device in the embodiment.

FIG. 9 is a schematic view illustrating a combined overhead image Ie (x, y). The combined overhead image Ie (x, y) is generated by converting the images (If (x, y), Il (x, y), Ir (x, y), Ib (x, y)) shown in FIG. 8 to the overhead images (Ife (x, y), Ile (x, y), Ire (x, y), Ibe (x, y)) viewed from the above and combining the overhead images.

The images captured by the imager 130 are converted to the overhead images by coordinate conversion on the assumption that a flat road surface in a predetermined distance below from a viewpoint at a predetermined position in the sky is observed. The relative positional relationship of the cameras (i.e. the front camera 20a, the rear camera 20b, the left side camera 20c, and the right side camera 20d) is known in advance. Accordingly, the overhead images are combined to meet the predetermined positional relationship so that the single combined overhead image Ie (x, y) is generated. The center of the combined overhead image Ie (x, y) is a blind spot and accordingly an icon C is displayed to indicate a state in which the vehicle V is looked down from directly above.

The surrounding information detector 140 mainly consists of the sonars 30a to 30f and the sonar ECU 32. The surrounding information detector 140 is configured to output detection results of the presence of an obstacle around the vehicle V and also output distance measurement results from the vehicle V to the obstacle.

The location information acquisition portion 150 mainly consists of the GPS device 50 and the navigation device 40. The location information acquisition portion 150 is configured to detect the current location of the vehicle V and to output the detection results as coordinate values. The coordinate values are absolute or relative coordinate values. For example, the coordinate values include latitude and longitude, MAPCODE (Registered Trademark), the combination of grid square codes and normalized coordinates, and Morton Code or the like.

The display portion 160 mainly consists of the monitor 41. The display portion 160 is configured to display predetermined images in response to a display control signal transmitted from the display controller 111 of the controller 100. Note that the descriptions of the actuator 170 and the sensor 180 are omitted since the configurations of the actuator 170 and the sensor 180 are substantially same as those of the actuator 70 and the sensor 80 shown in FIG. 1.

The input portion 190 mainly consists of a touch panel or touch screen (not shown) of the navigation device 40 and the like. The input portion 190 receives an operation input by the operator such as the driver. The input portion 190 generates an operation input signal in accordance with the received operation input and transmits the operation input signal to the controller 100.

The communication portion 195 mainly consists of a communication module of the navigation device 40. The communication portion 195 communicates with the information communication terminal 2. The communication portion 195 has a configuration capable of short-range wireless communication preferably via Bluetooth, wireless LAN or the like.

Figure 4:
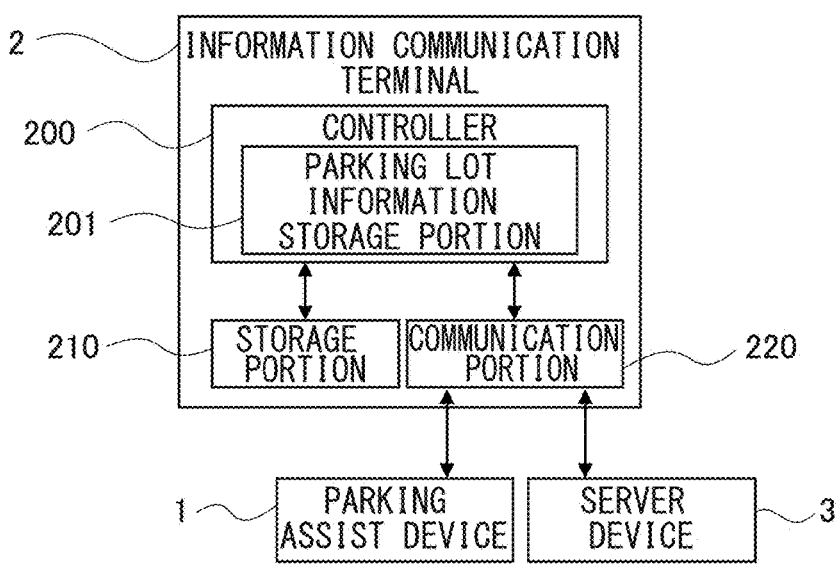
FIG. 4 is a functional block diagram schematically illustrating the configuration of an information communication terminal in the embodiment.

(Functional Configuration of Information Communication Terminal) FIG. 4 is a functional block diagram schematically illustrating the configuration of the information communication terminal 2 that is applied to the parking assist system S of the present embodiment.

The information communication terminal 2 of the present embodiment includes a controller 200, a storage portion 210, and a communication portion 220.

The controller 200 includes a parking lot storage portion 201. The parking lot storage portion 201 is configured to temporarily store the parking lot information 122 transmitted from the parking assist device 1 or the server device 3 in the storage portion 210 and to transmit the parking lot information 122 in response to a request from the parking assist device 1 or the server device 3.

The communication portion 220 communicates between the parking assist device 1 and the server device 3. The communication portion 220 preferably has a configuration capable of both mobile communication and short-range wireless communication via Bluetooth, wireless LAN or the like.

Figure 5:
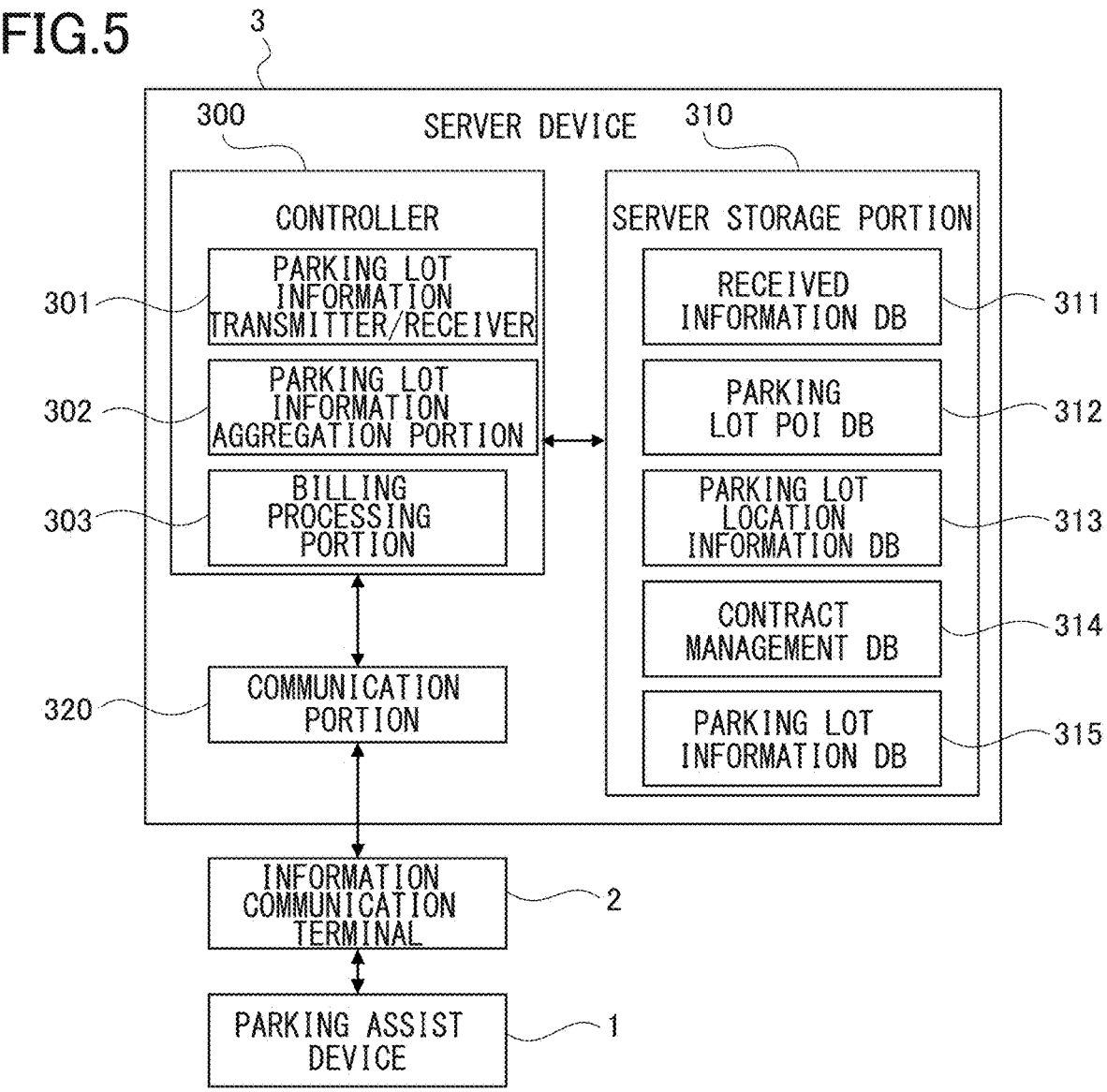
FIG. 5 is a functional block diagram schematically illustrating the configuration of a server device in the embodiment.

(Functional Configuration of Server Device) FIG. 5 is a functional block diagram schematically illustrating the configuration of the server device 3 that is applied to the parking assist system S of the present embodiment.

The server device 3 of the present embodiment includes a controller 300, a server storage portion 310, and a communication portion 320.

The controller 300 is configured to control the entire server device 3. The server storage portion 310 stores a control program (not shown). The controller 300 runs the control program when the server device 3 is started and the server device 3 has the functional configuration shown in FIG. 5.

The controller 300 includes a parking lot information transmitter/receiver 301, a parking lot information aggregation portion 302, and a billing processing portion 303.

The parking lot information transmitter/receiver 301 stores the parking lot information 122 transmitted from the parking lot information transmitter 106 of the parking assist device 1 in the received information DB (database) 311 of the server storage portion 310. When the parking lot information transmitter/receiver 301 receives the transmission request of the parking lot information 122 stored in the server storage portion 310 with the vehicle information 121 from the controller 100 of the parking assist device 1 and the vehicle information 121 included in the parking lot information 122 is coincident with (or corresponds to) the vehicle information 121 transmitted from the parking assist device 1, the parking lot information transmitter/receiver 301 transmits the parking lot information 122 stored in a parking lot information DB 315 to the parking assist device 1 that has requested the transmission of the parking lot information 122.

The parking lot information transmitter/receiver 301 transmits the parking lot information 122 when the vehicle information 121 included in the parking lot information 122 corresponds to the vehicle information 121 from the parking assist device 1 since installation positions, imaging, and detection ranges of the imagers 130 such as the cameras 20a to 20d in the vehicle V and the surrounding information detectors 140 such as the sonars 30a to 30f may be different from each other for each vehicle V. In other words, in order for the parking assist controller 108 of the parking assist device 1 performs the parking assist operation, it is preferable that the parking lot information 122, which is a criterion for determining the parking assist operation, is used as it is. Accordingly, it is preferable to use the parking lot information 122 acquired by the imager 130 and the surrounding information detector 140 whose installation positions are considered to be substantially the same. Therefore, the availability of the information acquired by the imager 130 and the surrounding information detector 140 is determined by the identity of the vehicle information 121.

The installation positions, the imaging, and the detection ranges of the imager 130 and the surrounding information detector 140 may be considered to be substantially the same even if the vehicle information 121 is different. Accordingly, it is preferable that the parking lot information transmitter/receiver 301 determines the transmission and reception of the parking lot information 122 considering the above.

The parking lot information aggregation portion 302 is configured to aggregate the parking lot information 122 stored in the received information DB 311 of the server storage portion 310 and to store this parking lot information 122 in the parking lot information DB 315 after organizing or sorting the parking lot information 122.

The billing processing portion 303 is configured to refer a contract management DB 314 stored in the server storage portion 310 and to perform billing process to the manager of the parking lot in accordance with contract information in the contract management DB 314 when the parking assist device 1 uses the parking lot information 122. The determination whether the parking assist device 1 has used the parking lot information 122 or not is made by the fact that the parking lot information transmitter/receiver 301 transmits the parking lot information 122 requested by the parking assist device 1, for example.

The server storage portion 310 temporarily or permanently stores various data that is used for various operations in the controller 300.

In addition, the server storage portion 310 stores a received information DB 311, a parking lot POI (Point of Interest) DB 312, a parking lot location information DB 313, the contract management DB 314, and the parking lot information DB 315.

FIG. 6 is a schematic view illustrating data structure of the database stored in the server storage portion 310 of the server device 3. The data bases (DBs) shown in FIG. 6 constitute a relational database as a whole. FIG. 6 only illustrates attributes or fields of each DB.

The received information DB 311 includes, as the attributes or the fields, a parking lot information ID 311a, a recording date 311b, recording start time 311c, parking lot location information 311d, parking lot image information 311e, parking lot surrounding information 311f, vehicle behavior information 311g, parking location information 311h, a vehicle type 311j, a vehicle model year 311k, a vehicle grade 311m, a vehicle identification number 311n, a parking section number 311p, and an achievement 311q.

The parking lot information ID 311a is an ID that is set such that the parking lot information transmitter/receiver 301 of the server device 3 uniquely identifies the parking lot information 122 when the parking lot information transmitter/receiver 301 receives the parking lot information 122 from the parking assist device 1 and then stores it in the received information DB 311.

The recording date 311b is a date when the parking lot information acquisition portion 105 of the parking assist device 1 acquires the parking lot information 122. The recording start time 311c is time when the parking assist device 1 starts recording the parking lot information 122. The recording date 311b and the recording start time 311c are included in the parking lot information 122 transmitted from the parking assist device 1.

The parking lot location information 311d is acquired by the parking lot location information acquisition portion 103 of the parking assist device 1. The parking lot image information 311e is acquired by the parking lot image information acquisition portion 101 of the parking assist device 1. The parking lot surrounding information 311f is acquired by the parking lot surrounding information acquisition portion 102 of the parking assist device 1. The vehicle behavior information 311g is acquired by the vehicle behavior information acquisition portion 109 of the parking assist device 1. The parking location information 311h is acquired by the parking location information acquisition portion 104 of the parking assist device 1.

The vehicle type 311j, the vehicle model year 311k, the vehicle grade 311m, and the vehicle identification number 311n respectively correspond to the vehicle type, the vehicle model year, the vehicle grade, and the vehicle identification number of the vehicle V from which the parking lot information 122 is acquired. The vehicle type 311j, the vehicle model year 311k, the vehicle grade 311m, and the vehicle identification number 311n constitute the vehicle information 121 of the host vehicle. The vehicle information 121 of the host vehicle is also included in the parking lot information 122 transmitted from the parking assist device 1.

The parking section number 311p is the number of the parking section of the parking lot in which the vehicle V is parked. The achievement 311q is information that indicates whether the vehicle V is successfully parked in the parking section of the parking lot or not. The parking section number 311p and the achievement 311q are also included in the parking lot information 122 transmitted from the parking assist device 1.

The parking lot POI DB 312 includes a POI ID 312a, a parking lot name 312b, and center coordinates 312c.

The POI ID 312a is an ID that is used to uniquely identify the parking lot and data that is a key for the relational data base stored in the server storage portion 310. The parking lot name 312b is a name of the parking lot that is identified by the POI ID 312a. The center coordinates 312c are the location coordinates of the central part of the parking lot identified by the POI ID 312a. The center coordinates 312c are used as the location coordinates representing the parking lot.

The parking lot location information DB 313 includes a POI ID 313a, an entrance/exit name 313b, and parking lot location information 313c.

The POI ID 313a is an ID that is used to uniquely identify the parking lot and in common with the POI ID 312a of the parking lot POI DB 312. The entrance/exit name 313b is a name of the entrance and exit of the parking lot that is identified by the POI ID 313a. In the case that there a plurality of entrances and exits, the entrance/exit name 313b identifies which entrance/exit it is. The parking lot location information 313c is the location coordinates of the entrance/exit identified by the entrance/exit name 313b. The parking lot location information 313c is in common with the parking lot location information 311d of the received information DB 311.

The contract management DB 314 includes a POI ID 314a and contract information 314b.

The POI ID 314a is an ID that is used to uniquely identify the parking lot and in common with the POI ID 312a of the parking lot POI DB 312.

The contract information 314b is the contract information of the parking lot identified by the POI ID 314a. The contract information 314b is information that is used as a basis when the billing processing portion 303 of the controller 300 performs the billing process to the manager of the parking lot as mentioned above. For example, the contract information 314b is a billing amount in the case that the billing processing portion 303 performs the billing process every time the parking lot information 122 is used. Also, the contract information 314b includes relationship between the number of usage and the billing amount in the case that the billing amount is different for each usage (e.g. billing amount is discounted if the number of usage increases). Further, in the case the billing amount on the premise of using the parking lot information 122 is an amount corresponding to a certain period (e.g. month), the contract information 314b includes such a period and the billing amount. Moreover, in the case that the billing process is performed only when the vehicle V is successfully parked by using the parking lot information 122, the contract information 314b includes such a condition.

The parking lot information DB 315 includes a POI ID 315a, a vehicle type 315b, a vehicle model year 315c, a vehicle grade 315d, a parking section number 315e, the number of achievements (success) 315f, the number of achievements (failure) 315g, a last parked date 315h, a recording date 315j, recording start time 315k, a parking lot information ID 315m, parking lot location information 315n, parking lot image information 315p, parking lot surrounding information 315q, vehicle behavior information 315r, and parking location information 315s.

The POI ID 315a is an ID that is used to uniquely identify the parking lot and in common with the POI ID 312a of the parking lot POI DB 312.

The vehicle type 315b, the vehicle model year 315c, and the vehicle grade 315d are in common with the vehicle type 311j, the vehicle model year 311k, and the vehicle grade 311m of the received information DB 311. The vehicle type 315b, the vehicle model year 315c, and the vehicle grade 315d also constitute the vehicle information 121 of the host vehicle.

The parking section number 315e is in common with the parking section number 311p of the received information DB 311. The number of achievements (success) 315f represents how many pieces of information or data on which the vehicle has successfully been parked (i.e. how many times the vehicle has been successfully parked) are included in the achievement 311q of the received information DB 311. Similarly, the number of achievements (failure) 315g represents how many pieces of information or data on which the vehicle has failed to be parked (i.e. how many times the parking of the vehicle has been failed) are included in the achievement 311q of the received information DB 311.

Every time the parking lot information 122 is transmitted from the parking assist device 1, the recording date 311b included in the parking lot information 122 is overwritten and a date when the vehicle V is lastly (i.e. recently) parked by the parking assist operation of the parking assist device 1 is recorded in the last parked date 315h.

The recording start time 315k is in common with the recording start time 311c of the received information DB 311. The parking lot information ID 315n is in common with the parking lot information ID 311a of the received information DB 311.

The parking lot location information 315*n*, the parking lot image information 315*p*, the parking lot surrounding information 315*q*, the vehicle behavior information 315*r*, and the parking location information 315*s* are in common with the parking lot location information 311*d*, the parking lot image information 311*e*, the parking lot surrounding information 311*f*, the vehicle behavior information 311*g*, and the parking location information 311*h* of the received information DB 311, respectively.

Retuning to FIG. 5, the communication portion 320 communicates with the information communication terminal 2. The communication portion 320 includes a configuration capable of communicating with WAN or the Internet.

(Information between Parking Assist Device and Server Device) FIG. 7 is a schematic view illustrating the communication of the information between the parking assist device 1 and the server device 3. The parking lot information 122 and the achievements are transmitted from the parking assist device 1 (parking assist device of other vehicle) to the server device 3 every time the vehicle V (other vehicle in this case) including the parking assist device 1 is parked in the parking section of the parking lot. The parking lot information 122 and the achievements are temporarily stored in the received information DB 311. The parking lot information aggregation portion 302 performs the aggregation process at a predetermined timing and the results of the aggregation process are stored in the parking lot information DB 315.

The parking assist device 1 (parking assist device of host vehicle) requests the server device 3 to transmit the parking lot information 122 when the vehicle needs to be parked in the parking section of the parking lot. The parking lot information transmitter/receiver 301 of the server device 3 transmits the parking lot information 122 stored in the parking lot information DB 315 to the parking assist device 1 when the transmission of the parking lot information 122 is requested from the parking assist device 1 and the vehicle information 121 matches.

Figure 10:
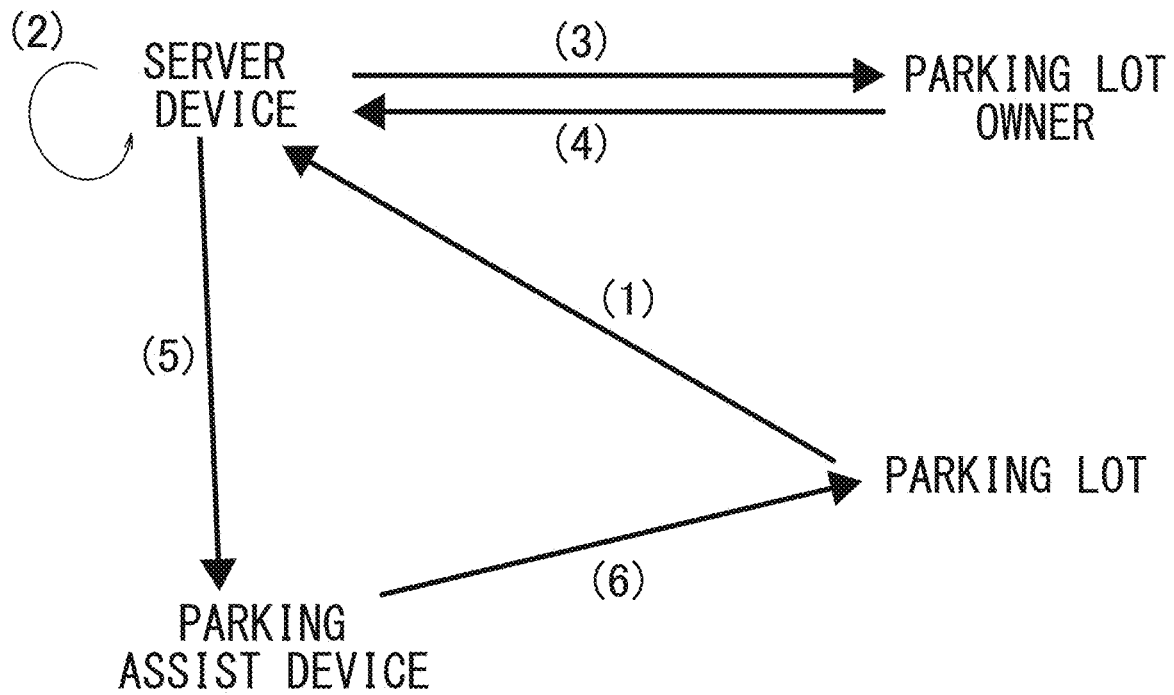
FIG. 10 is a schematic view illustrating an example of the operation of the parking assist system in the embodiment.
Figure 11:
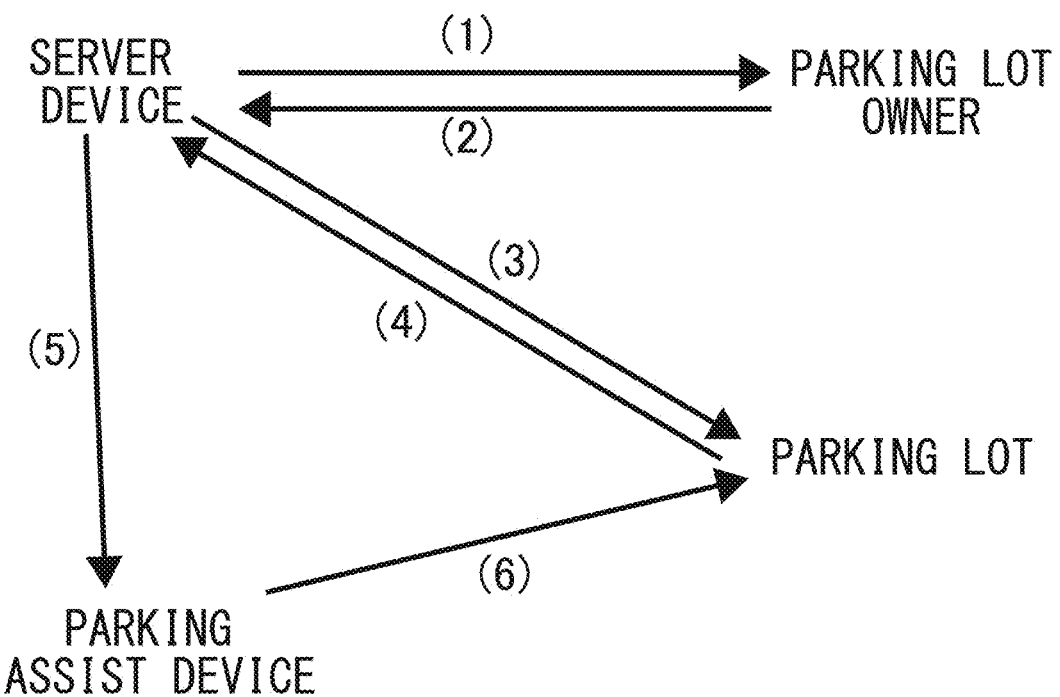
FIG. 11 is a schematic view illustrating another example of the operation of the parking assist system in the embodiment.

(Operation of Parking Assist System) FIG. 10 and FIG. 11 are schematic views illustrating examples of the operations of the parking assist system in the embodiment.

As shown in FIG. 10, when a driver parks the vehicle (other vehicle) in the parking section of the parking lot, the parking assist device 1 provided in the other vehicle acquires various data, and transmits the acquired data to the server device 3 as the parking lot information 122 (1). The server device 3 accumulates the parking lot information 122 transmitted from the parking assist device 1 (2).

At the stage where the parking lot information 122 is accumulated to some extent, the operator (operating company) of the server device 3 asks the owner (manager) of the parking lot corresponding to each parking lot information 122 whether he or she wants to use the billing process or not instead of providing the parking lot information 122 to the users (drivers) of the parking assist device 1 (3). The owner of the parking lot requests the provision of the parking lot information 122 in response to the above and would pay the advance payment to the operator of the server device 3 if necessary (4).

The server device 3 transmits the parking lot information 122 to the parking assist device 1 (5) when the transmission of the parking lot information 122 is requested from the parking assist device 1. Then, the user (driver) of the parking assist device 1 parks the vehicle in the parking section of the parking lot by using the parking lot information 122 (6).

The operation shown in FIG. 10 is suitable for the relatively small parking lot.

In the operation shown in FIG. 11, the operator of the server device 3 first asks the owner (manager) of the parking lot whether he or she wants to use the billing process or not instead of providing the parking lot information 122 to the users (drivers) of the parking assist device 1 (1). The owner of the parking lot requests the provision of the parking lot information 122 in response to the above and would pay the advance payment to the operator of the server device 3 if necessary (2).

The operator of the server device 3 dispatches the vehicle (other vehicle) to the parking lot whose owner has requested the provision of the parking lot information 122 to acquire various data (3). The other vehicle transmits the data as the parking lot information 122 to the server device 3 (4).

The server device 3 transmits the parking lot information 122 to the parking assist device 1 when the transmission of the parking lot information 122 is requested from the parking assist device 1 (5). Then, the user (driver) of the parking assist device 1 parks the vehicle in the parking section of the parking lot by using the parking lot information 122 (6).

The operation shown in FIG. 11 is suitable for the relatively large parking lots such as the parking lots of a large-scale buildings, shopping centers, or shopping malls, for example.

(Example of Parking Assist Operation) The parking assist operation will be described with reference to FIG. 12 to FIG. 14. Note that the parking assist operations used in the parking assist system S of the present embodiment are not limited to ones shown in FIG. 12 to FIG. 14.

Figure 12:
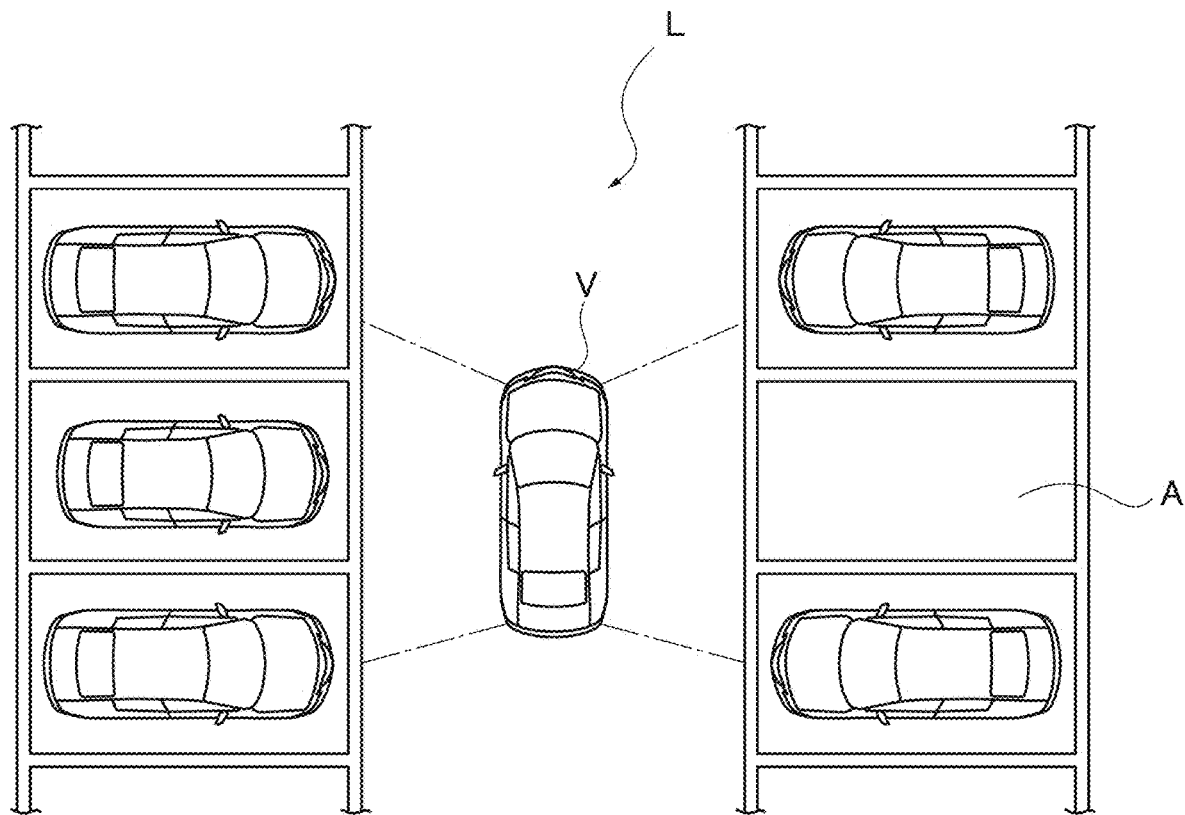
FIG. 12 is a schematic view illustrating that the imagers of the parking assist device are capturing parking sections of a parking lot in the embodiment.
Figure 13:
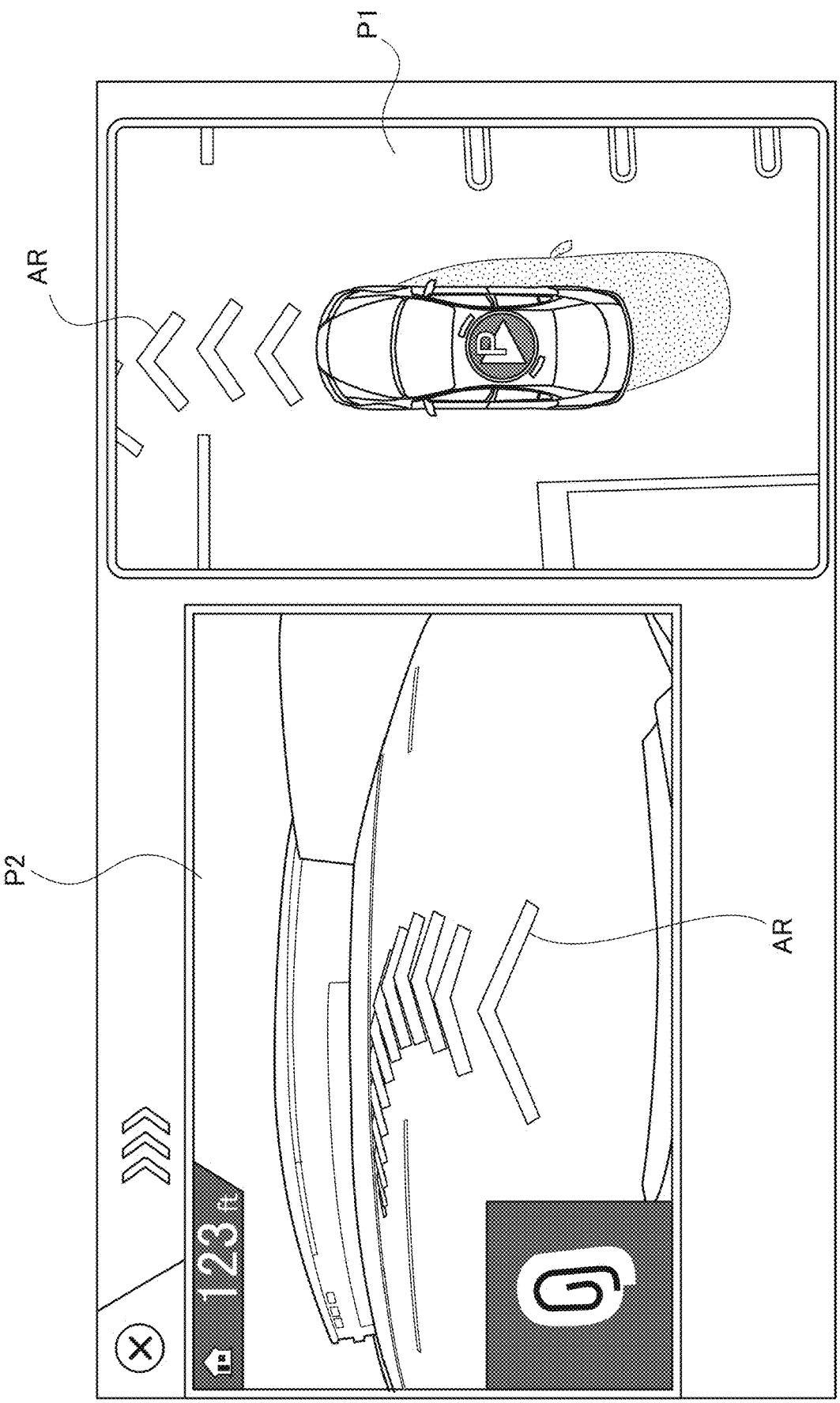
FIG. 13 is a schematic view illustrating an example of a parking assist operation by the parking assist device of the embodiment.
Figure 14:
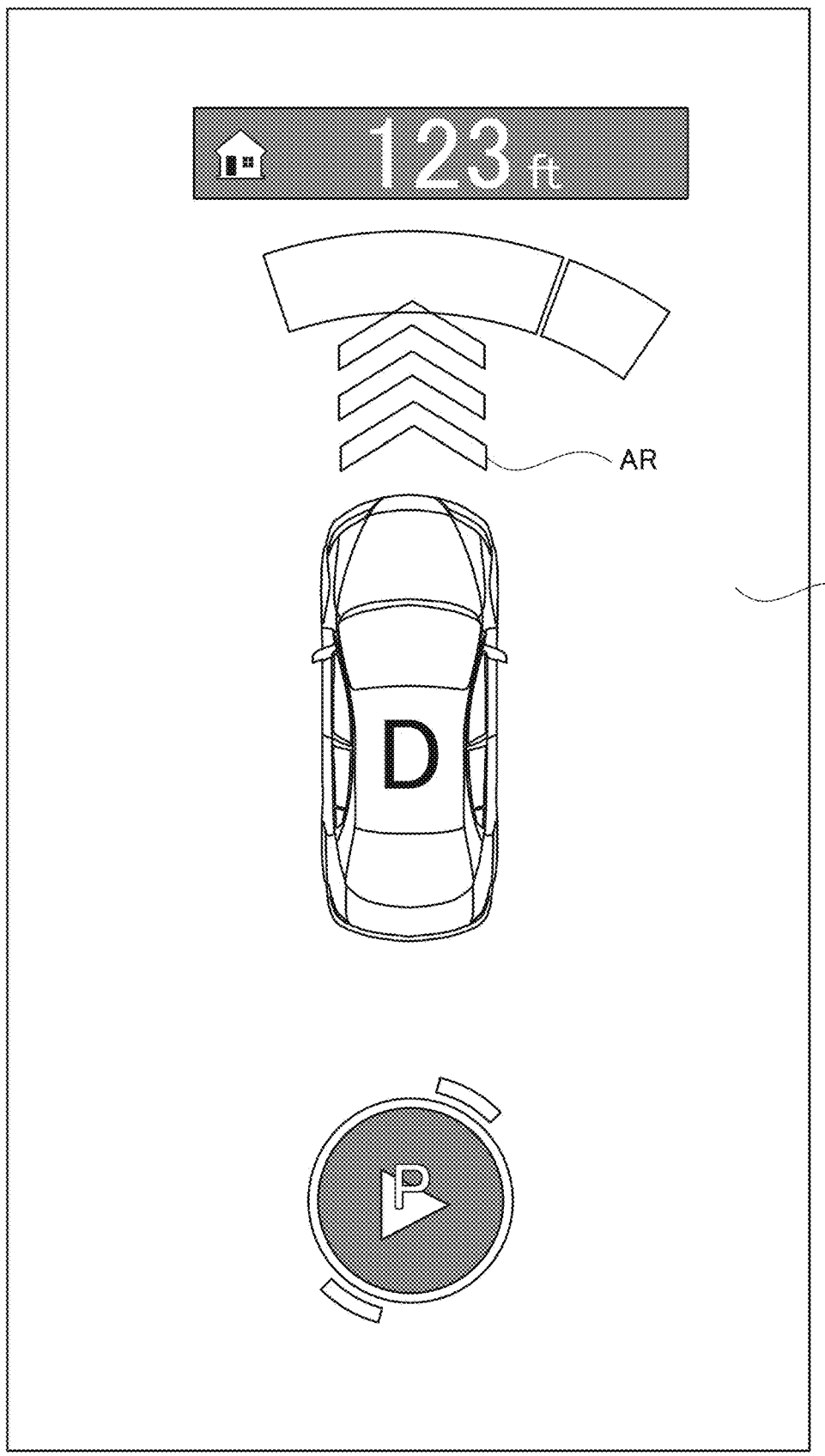
FIG. 14 is a schematic view illustrating an example of the parking assist operation by an information processing terminal of the embodiment.

As shown in FIG. 12, the parking assist operation shown in FIG. 13 to FIG. 14 is used when assisting the driver who performs the parking operation to park the vehicle V (the host vehicle) in a parking section A of a parking lot L.

FIG. 13 illustrates an example of an image displayed on the monitor 41 of the navigation device 40 in the parking assist device 1 according to the present embodiment.

The images shown in FIG. 13 are displayed from the time when the vehicle V enters the parking lot L through the entrance/exit of the parking lot L acquired by using the parking lot information 122. The images include the overhead image P1 acquired by using the cameras 20*a* to 20*d* and the front image P2 of the vehicle V acquired by the front camera 20*a*.

Each of the images P1 and P2 includes arrows AR that indicate the direction to which the vehicle V moves in the parking section A where the vehicle V is parked. The vehicle V is guided along the arrows AR when the operator keeps pressing a button or an icon as a mark P displayed on the image P1.

FIG. 14 is a view illustrating an image displayed on a display portion (not shown) of the information communication terminal 2 in the present embodiment.

Similar to the images shown in FIG. 13, the image shown in FIG. 14 is also displayed from the time when the vehicle V enters the parking lot L through the entrance/exit of the parking lot L acquired by using the parking lot information 122. The image also includes arrows AR that indicate the direction in which the vehicle V moves to the parking section A where the vehicle V is parked. The vehicle V is guided along the arrows AR when the operator keeps pressing the bottom displayed on the image P1 as the mark P.

(Operation of Parking Assist System) An example of the operation of the parking assist system S according to the present embodiment will be described with reference to the flowcharts shown in FIG. 15 to FIG. 18. Note that the descriptions with regard to the operation of the portions in the parking assist system S that have already been described are omitted.

Figure 15:
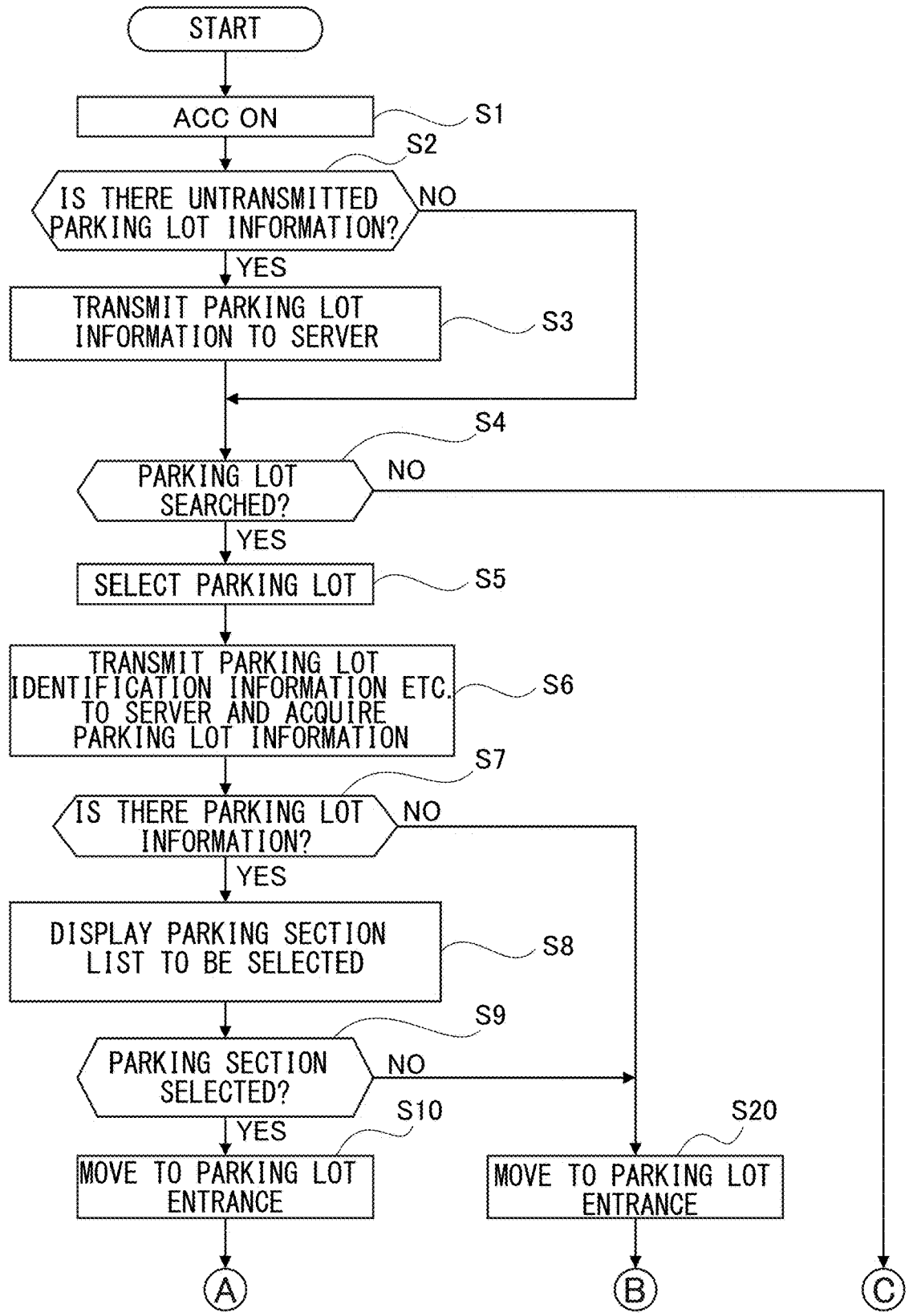
FIG. 15 is a flowchart illustrating an example of operation of the parking assist device according to the embodiment.
Figure 16:
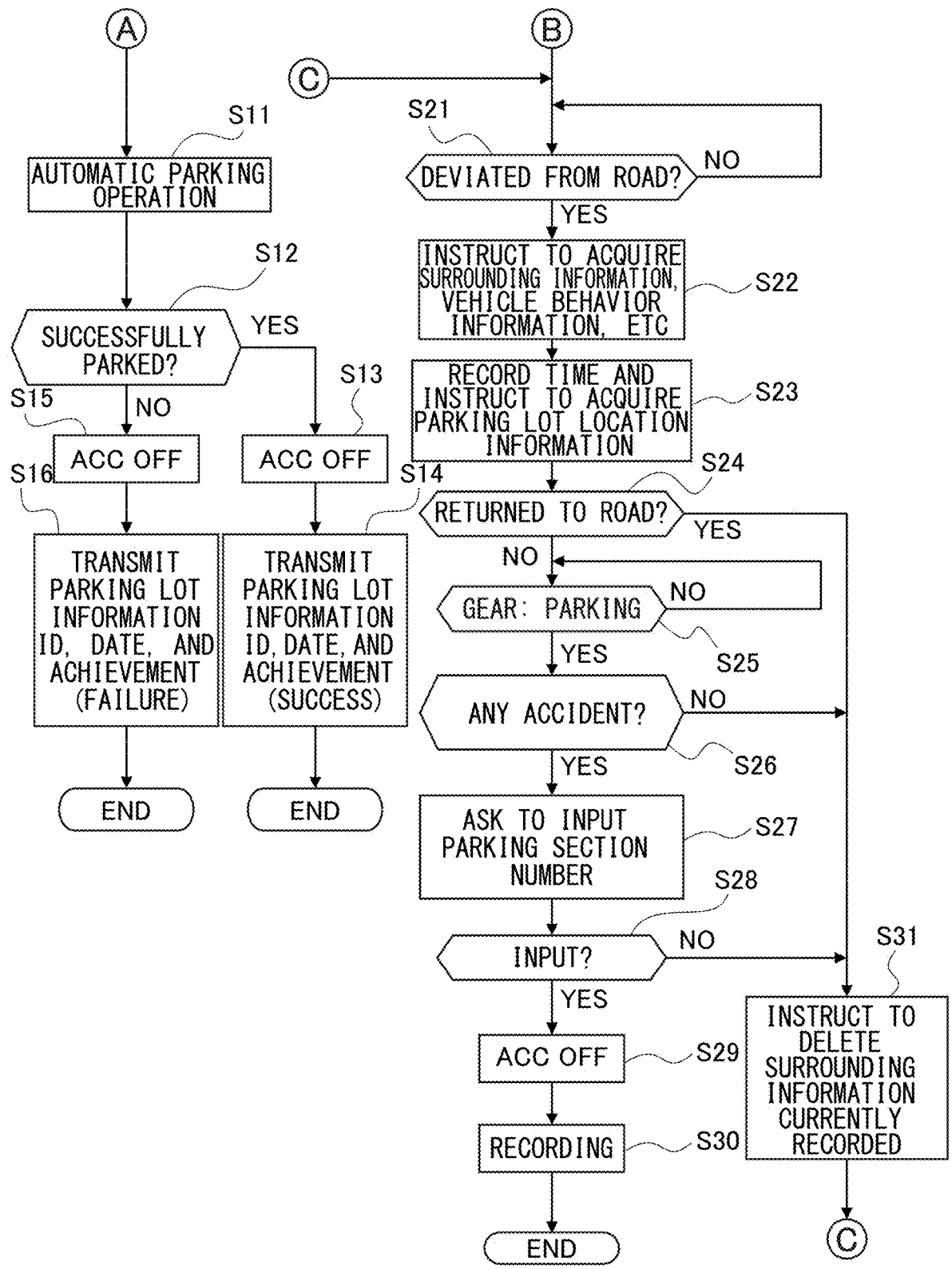
FIG. 16 is a flowchart illustrating an example of the operation of the parking assist device according to the embodiment.

FIG. 15 to FIG. 16 show flowcharts illustrating the operation of the parking assist device 1. The operation in the flowchart shown in FIG. 15 starts when the vehicle V including the parking assist device 1 is started, that is when the ignition switch is turned on. First, in Step S1, the ACC power is turned on when the driver operates (pushes or turns) the ignition switch.

In Step S2, it is determined whether untransmitted parking lot information 122 is stored in the parking assist device storage portion 120 or not. If there is the untransmitted parking lot information 122 (i.e. YES in Step S2), in Step S3, the parking lot information transmitter 106 transmits the untransmitted parking lot information 122 stored in the parking assist device storage portion 120 via the communication portion 195 and the information communication terminal 2. On the other hand, the program proceeds to Step S4 in the case that it is determined that all parking lot information 122 has been transmitted (i.e. NO in Step S2).

The parking lot information 122 transmitted in Step S3 may include information such as the recording start date and time provided by the clock 110 at the start of recording of the parking lot information 122, the parking lot location information, the parking lot surrounding information, the vehicle behavior information, the vehicle information, and the parking section number, for example.

In Step S4, the operator of the navigation device 40 inputs an instruction whether he or she wants to search the parking lot whose parking lot information 122 has already been stored in the server device 3 via the touch screen of the navigation device 40 or the like to park the vehicle V in the parking section A of the parking lot L. The controller 100 of the parking assist device 1 determines whether the operator is searching the parking lot L or not in response to the operation input. The program proceeds to Step S5 in the case that it determines that there is an input to search the parking lot L (i.e. YES in Step S4). On the other hand, the program proceeds to Step S21 in the case that it determines that there is no input to search the parking lot (i.e. NO in Step S4).

In Step S5, the operator selects one of the parking lots, for example, from the list of the parking lots displayed on the monitor 41 of the navigation device 40. For example, the list of parking lots is made based on the map data included in the navigation device 40 or the like.

In Step S6, the controller 100 of the parking assist device 1 transmits to the server device 3 the information for identifying the parking lot selected in Step S5, for example, the POI ID of the parking lot, and the vehicle information 121 stored in the parking assist device storage portion 120.

The server device 3 that has received the information for identifying the parking lot and the vehicle information 121 searches the parking lot information DB 315 by using the transmitted information for identifying the parking lot and the vehicle information 121 as keys. In the case that there is the parking lot information 122 that includes the substantially same vehicle information 121 and whose POI ID is coincident, the parking lot information transmitter/receiver 301 transmits the parking lot information 122 to the parking assist device 1 to which the information is transmitted in Step S6.

In Step S5, the parking lot information transmitter/receiver 301 may transmit the list of the parking lot information 122 that includes the coincident vehicle information 121 and the list may be selected via the navigation device 40.

In Step S7, the parking lot information receiver 107 determines whether the parking lot information 122 has been transmitted from the server device 3 in Step S6. The program proceeds to Step S8 in the case that the parking lot information 122 has been transmitted (i.e. YES in Step S7). On the other hand, the program proceeds to Step S20 in the case that the parking lot information 122 has not been transmitted, that is in the case that it is determined that the parking lot information 122 including the substantially same vehicle information 121 and the coincident POI ID has not been stored in the server storage portion 310 (i.e. NO in Step S7).

In Step S8, the controller 100 displays the list of the parking sections A that is included in the parking lot information 122 transmitted in Step S6 on the monitor 41 and waits for the selective input done by the operator.

In Step S9, the controller 100 determines whether there is the selective input for the parking section A or not in Step S8. In the case that it is determined that there is the selective input for the parking section A (i.e. YES in Step S9), the program proceeds to Step S10. On the other hand, it is determined that there is no selective input for the parking section A (i.e. NO in Step S9), the program proceeds to Step S20.

In Step S10, the driver manually drives the vehicle V including the parking assist device 1 to the entrance of the parking lot L corresponding to the acquired parking lot information 122. At this time, the navigation device 40 may guide the route based on the parking lot location information included in the parking lot information 122.

As shown in FIG. 16, in Step S11, the operator of the navigation device 40 instructs the parking assist device 1 to perform the parking assist operation when the vehicle V has reached the entrance/exit of the parking lot. In response to the instruction for the parking assist operation, the controller 100 of the parking assist device 1, specifically the parking assist controller 108 assists the parking operation to park the vehicle V in the parking section A of the parking lot L based on the parking lot information 122. At the same time, the controller 100 of the parking assist device 1 controls the parking lot surrounding information acquisition portion 102 to record information regarding obstacles around the vehicle V and the vehicle behavior information acquisition portion 109 to acquire the behavior information of the vehicle V.

In Step S12, the controller 100 of the parking assist device 1 determines whether the vehicle V has been successfully parked in the parking section A based on information such as the parking lot surrounding information acquired by the parking lot surrounding information acquisition portion 102 and the vehicle behavior information acquired by the vehicle behavior information acquisition portion 109. In the case that it is determined that the vehicle V has been successfully parked in the parking section A (i.e. YES in Step S12), the program proceeds to Step S13. On the other hand, in the case that it is determined that the vehicle V has not been successfully parked in the parking section A (i.e. NO in Step S12), the program proceeds to Step S15.

In Step S13, it waits the driver to turn off the ACC power. In Step S14, the parking lot information transmitter 106 transmits to the server device 3 the parking lot information ID included in the parking lot information 122 and the achievement (success) that indicates the success of the parking.

On the other hand, in Step S15, it waits the driver to turn off the ACC power. In Step S16, the parking lot information transmitter 106 transmits to the server device 3 the parking lot information ID included in the parking lot information 122 and the achievement (failure) that indicates the failure of the parking.

Returning to FIG. 15, the driver manually drives the vehicle V including the parking assist device 1 to the entrance of the parking lot L in which the driver wants to park the vehicle in Step S20 since it has been determined that there is no parking lot information 122 corresponding to the parking lot L or the parking section A of the parking lot L in which the driver wants to park the vehicle.

As shown in FIG. 16, in Step S21, the controller 100 of the parking assist device 1 waits for the vehicle V to deviate from the road by referring to the map data or the like of the GPS device 50 and the navigation device 40. The deviation of the vehicle V from the road can be regarded as the vehicle V has reached the entrance/exit of the parking lot and entered the parking lot L through the entrance/exit. The program proceeds to Step S22 when it is determined that the vehicle V has deviated from the road (i.e. YES in Step S21).

In Step S22, the controller 100 of the parking assist device 1 instructs the parking lot image information acquisition portion 101, the parking lot surrounding information acquisition portion 102, and the vehicle behavior information acquisition portion 109 to acquire the parking lot image information, the parking lot surrounding information, and the vehicle behavior information, respectively. At this time, it is preferable that the parking lot image information acquisition portion 101, the parking lot surrounding information acquisition portion 102, and the vehicle behavior information acquisition portion 109 include information from a location that goes back for a predetermined distance (e.g. a few meters) from the entrance of the parking lot L and such information is included in the parking lot information 122.

In Step S23, the controller 100 of the parking assist device 1 stores (or records) the recording start time of the parking lot information 122 in the parking assist device storage portion 120 by referring to time information provided from the clock 110, and instructs the parking lot location information acquisition portion 103 to acquire the parking lot location information.

In Step S24, the controller 100 of the parking assist device 1 determines whether the vehicle V has returned to the road by referring to the map data or the like of the GPS device 50 and the navigation device 40. In the case that it is determined that the vehicle V has returned to the road (i.e. YES in Step S24), it is considered that the driver has stopped parking in the parking lot L and the program proceeds to Step S31. On the other hand, in the case that it is determined that the vehicle V has not returned to the road (i.e. NO in Step S24), it is considered that the driver is still performing the parking operation and the program proceeds to Step S25.

In Step S25, the controller 100 of the parking assist device 1 waits the transmission (gear) of the vehicle V to be set to the parking position in accordance with the vehicle behavior information acquired by the vehicle behavior information acquisition portion 109. Setting it to the parking position is considered that the parking operation of the vehicle V has been done at that time. The program proceeds to Step S26 in the case that the transmission (gear) is set to the parking position (i.e. YES in Step S25).

In Step S26, the controller 100 of the parking assist device 1 determines whether there is an accident such as a contact with another vehicle while the vehicle V is performing the parking operation based on the vehicle behavior information acquired by the vehicle behavior information acquisition portion 109. The program proceeds to Step S27 in the case that it is determined that there is no accident (i.e. YES in Step S26). On the other hand, the program proceeds to Step S31 in the case that it is determined that an accident has occurred (i.e. NO in Step S26).

In Step S27, the controller 100 of the parking assist device 1 displays, on the monitor 41 of the navigation device 40, an image that prompts the operator to input the number of the parking section A and asks the operator to input the number of the parking section A in which the vehicle is parked via the navigation device 40.

The operator is asked to input the number of the parking section A since it is difficult to acquire the number of the parking section A from the imager 130, the surrounding information detector 140, or the like.

In Step S28, the controller 100 of the parking assist device 1 determines whether the number of the parking section A has been input in Step S27 or not. In the case that it is determined that the number has been input (i.e. YES in Step S28), the program proceeds to Step S29. On the other hand, it is determined that the number has not been input or that the operator refuses to share the parking lot information 122 (i.e. NO in Step S28), the program proceeds to Step S31.

In Step S29, it waits for the ACC power of the vehicle V to be turned off. In Step S30, the parking lot information acquisition portion 105 of the parking assist device 1 acquires the parking lot information 122 in relation to the current parking operation of the vehicle V and stores (or records) it in the parking assist device storage portion 120.

On the other hand, in Step S31, the controller 100 of the parking assist device 1 deletes or discards the information that has been recorded when the recording or storing of the parking lot information 122 has to be interrupted (e.g. vehicle returns to the road); the recorded parking lot information 122 cannot be used by the other vehicle(s) (e.g. an accident occurs during the parking operation; the number of the parking section A is not input, etc.); or the sharing of the parking lot information 122 is rejected. Then, the program returns to Step S21.

Figure 17:
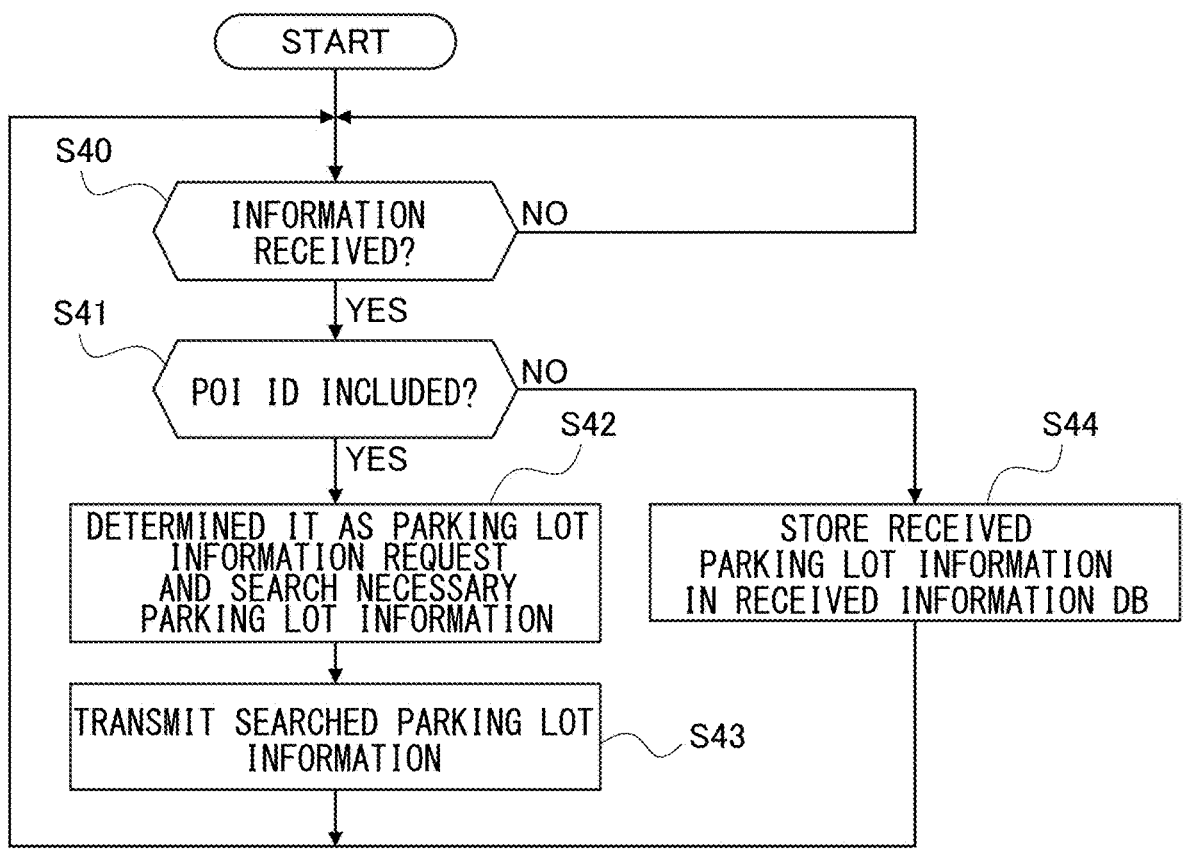
FIG. 17 is a flowchart illustrating an example of operation of the server device according to the embodiment.

FIG. 17 is a flowchart illustrating the operation of the parking lot information transmitter/receiver 301 of the server device 3.

First, in Step S40, it waits for the parking lot information transmitter/receiver 301 to receive the information from the parking assist device 1. The program proceeds to Step S41 in the case that it is determined that the information has been received (i.e. YES in Step S40). Then, in Step S41, it is determined whether the parking lot information transmitter/receiver 301 received in Step S40 includes the POI ID or not. The program proceeds to Step S42 in the case that it is determined that the POI ID is included (i.e. YES in Step S41). On the other hand, the program proceeds to Step S44 in the case that it is determined that the POI ID is not included (i.e. NO in Step S41).

In Step S42, the information transmitted from the parking assist device 1 is determined (considered) as the transmission request for the parking lot information 122, and the parking lot information transmitter/receiver 301 searches the parking lot information DB 315 by using the POI ID and the vehicle information 121 as the keys. In Step S43, the parking lot information transmitter/receiver 301 transmits the parking lot information 122 searched in Step S42 to the parking assist device 1.

On the other hand, in Step S44, the information transmitted from the parking assist device is determined (considered) as the parking lot information 122, and the parking lot information transmitter/receiver 301 stores (saves) the received parking lot information 122 in the received information DB 311.

Figure 18:
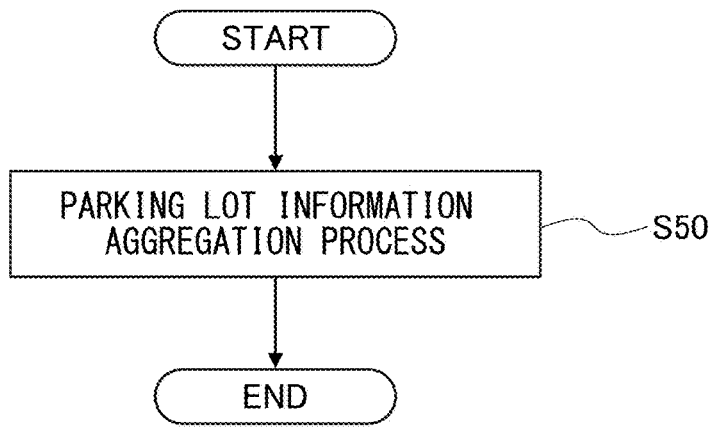
FIG. 18 is a flowchart illustrating another example of operation of the server device according to the embodiment.

FIG. 18 is the flowchart illustrating the operation of the parking lot information aggregation portion 302 of the server device 3. The flowchart shown in FIG. 18 starts at predetermined time (e.g. at midnight every day).

In Step S50, the parking lot information aggregation portion 302 performs the aggregation process on the parking lot information 122 stored in the received information DB 311 and stores the parking lot information 122 on which the aggregation process has been performed in the parking lot information DB 315. The aggregation process is performed, for example, by aggregating or accumulating the POI ID, the vehicle information 121 and the parking section number, and sorting them in ascending order.

In the parking assist system S of the present embodiment configured as above, the server storage portion 310 of the server device 3 stores the parking lot information 122 acquired when the vehicle V is parked in the parking section A of the parking lot L. The parking assist controller 108 of the parking assist device 1 controls so that the vehicle V is parked in the parking section A of the parking lot L in accordance with the parking lot information 122 acquired from the server device 3.

As a result, the parking lot information on the parking lot in which the vehicles have been previously parked can be shared. According to the parking assist system S of the present embodiment, the parking assist system S can be smoothly operated since the server device 3 includes the billing processing portion 303.

The embodiment and examples of the present disclosure has been described with reference to the drawings. However, the specific configurations or structures are not limited to ones in the embodiment and the examples, and the present disclosure includes modifications and changes thereof and additions thereto without departing from the gist of the present disclosure.

For example, the parking assist device 1 includes the navigation device 40 in the above embodiment, but the navigation device 40 is not an essential component. In the case that the navigation device 40 is not provided, map data for the automatic drive may be used instead of the map data included in the navigation device 40.

A plurality of pieces of the parking lot information 122 with regard to the same vehicle information 121 and the same parking section A may be stored in the server storage portion 310 of the server device 3. In this case, the parking lot information 122 whose current time is close to the recording start time included in the parking lot information 122 may be selected. The parking lot image information, and the like included in the parking lot information 122 differs depending on the day or night, for example. Accordingly, it is preferable to select the parking lot information 122 that is more easily used by the parking assist device 1 if the time is close. Similarly, the classification of seasons may be used to select the parking lot information 122 including the same or similar season classification.

In the case that the server storage portion 310 of the server device 3 stores a plurality of pieces of the parking lot information 122 with regard to the same vehicle information 121 and the same parking section A, the parking lot information 122 with a low utilization rate may be deleted or discarded. For example, only the parking lot information 122 of the latest five recording start time may be left in the server storage portion 310. Also, only five pieces of parking lot information 122 may be left in the server storage portion 310 in descending order of the numbers of the achievements (success) (i.e. most popular). Alternatively, only five pieces of the parking lot information 122 may be left in the server storage portion 310 in descending order of the success rate (percentage of achievements (success)).

In addition, the parking lot information 122 may include weather information, and the parking lot information 122 whose weather information is coincident with or similar to another weather information may be selected. Also, the parking lot information 122 may include the image information (thumbnail image information) of the parking lot entrance and exit, and the thumbnail image information may be displayed on the monitor 41 when the parking lot information 122 is selected.

The parking lot surrounding information may be transmitted to the server device 3 when the parking assist operation by the parking lot information 122 fails. Thereby, a reason of the failure of the parking assist operation may be analyzed.

The invention claimed is:

1. A parking assist system comprising:
a server device; and
a parking assist device provided in a host vehicle to communicate with the server device,
wherein the server device comprises a server storage portion configured to store parking lot information acquired when a second vehicle different from the host vehicle is parked in a parking section of a parking lot,
wherein the parking assist device comprises:
a parking lot information receiver configured to receive the parking lot information from the server device; and
a parking assist controller configured to control the host vehicle based on the obtained parking lot information to park the host vehicle in the parking section of the parking lot,
wherein the parking assist device is configured to transmit vehicle information regarding the host vehicle provided with the parking assist device to the server device,
wherein the parking lot information stored in the server storage portion comprises vehicle information on the second vehicle, and
wherein the server device comprises a parking lot information transmitter/receiver configured to transmit to the parking assist device the parking lot information comprising vehicle information on the second vehicle corresponding to the vehicle information received from the parking assist device,
wherein the parking lot information comprises:
parking lot location information regarding an entrance and exit of the parking lot,
parking lot image information acquired by capturing images of a road to the parking section,
parking lot surrounding information regarding any obstacles around the road to the parking section, and
parking location information on the parking section,
wherein the parking assist controller is further configured to control the host vehicle by referring to the parking lot location information, the parking lot image information, the parking lot surrounding information, and the parking location information.

2. The parking assist system according to claim 1, wherein the parking assist device is configured to transmit parking location information including location information on the parking section to the server device when an ignition switch of the second vehicle is turned on after the second vehicle is parked in the parking section.

3. A parking assist device in a host vehicle comprising:
a parking assist device storage portion configured to store vehicle information on the host vehicle;
a parking lot information transmitter configured to transmit the vehicle information on the host vehicle to a server device;
a parking lot information receiver configured to acquire from the server device parking lot information acquired when a second vehicle different from the host vehicle is parked in a parking section of a parking lot, the parking lot information corresponding to the vehicle information on the host vehicle; and
a parking assist controller configured to control the host vehicle to park in the parking section of the parking lot in accordance with the acquired parking lot information,
wherein the parking assist device is configured to transmit vehicle information regarding the host vehicle provided with the parking assist device to the server device,
wherein the parking lot information stored in the server storage portion comprises vehicle information on the second vehicle, and
wherein the server device comprises a parking lot information transmitter/receiver configured to transmit to the parking assist device the parking lot information comprising vehicle information on the second vehicle corresponding to the vehicle information received from the parking assist device,
wherein the parking lot information comprises:
parking lot location information regarding an entrance and exit of the parking lot,
parking lot image information acquired by capturing images of a road to the parking section,
parking lot surrounding information regarding any obstacles around the road to the parking section, and
parking location information on the parking section,
wherein the parking assist controller is further configured to control the host vehicle by referring to the parking lot location information, the parking lot image information, the parking lot surrounding information, and the parking location information.

* * * * *